United States Patent
Mao et al.

(10) Patent No.: US 12,497,285 B2
(45) Date of Patent: Dec. 16, 2025

(54) STOPPER BUMP STRUCTURES FOR MEMS DEVICE

(71) Applicant: Taiwan Semiconductor Manufacturing Company, Ltd., Hsinchu (TW)

(72) Inventors: Wei-Jhih Mao, Taipei (TW); Shang-Ying Tsai, Pingzhen (TW); Kuei-Sung Chang, Kaohsiung (TW); Chun-Wen Cheng, Zhubei (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 616 days.

(21) Appl. No.: 17/690,768

(22) Filed: Mar. 9, 2022

(65) Prior Publication Data

US 2023/0257256 A1    Aug. 17, 2023

Related U.S. Application Data

(60) Provisional application No. 63/310,764, filed on Feb. 16, 2022.

(51) Int. Cl.
*B81B 3/00* (2006.01)
*B81B 7/00* (2006.01)

(52) U.S. Cl.
CPC .......... *B81B 3/0051* (2013.01); *B81B 7/0016* (2013.01); *B81B 2207/03* (2013.01)

(58) Field of Classification Search
CPC ............... B81B 3/0051; B81B 7/0016; B81B 2207/012; B81B 7/0058; B81B 2201/0235; H01H 3/60
See application file for complete search history.

(56) References Cited

U.S. PATENT DOCUMENTS

| | | | |
|---|---|---|---|
| 9,630,837 B1 | 4/2017 | Chu et al. | |
| 9,695,039 B1* | 7/2017 | Liu | B81B 3/0051 |
| 9,738,516 B2* | 8/2017 | Chou | B81C 1/00595 |
| 10,150,664 B2* | 12/2018 | Chang | B81B 3/001 |
| 2008/0156095 A1* | 7/2008 | Tsuji | G01P 1/023 |
| | | | 29/592.1 |
| 2010/0251818 A1* | 10/2010 | Ge | G01C 19/5684 |
| | | | 156/60 |
| 2010/0290199 A1* | 11/2010 | Schmid | B81C 1/00301 |
| | | | 361/752 |
| 2013/0241013 A1* | 9/2013 | Yamanaka | B81B 7/0058 |
| | | | 257/420 |

(Continued)

OTHER PUBLICATIONS

EPFL "Aerosol Jet Printing of Electronic and Sensor Components" Published in 2022.

*Primary Examiner* — Chad M Dicke
*Assistant Examiner* — Jeremy Daniel Watts
(74) *Attorney, Agent, or Firm* — Eschweiler & Potashnik, LLC

(57) ABSTRACT

Various embodiments of the present disclosure are directed towards an integrated chip (IC) including a substrate. A plurality of adhesive structures is disposed on the substrate. A microelectromechanical systems (MEMS) structure is disposed on the adhesive structures. The MEMS structure comprises a movable element disposed within a cavity. A first plurality of stopper bumps is disposed between the movable element and the substrate.

20 Claims, 29 Drawing Sheets

(56) References Cited

U.S. PATENT DOCUMENTS

| | | | |
|---|---|---|---|
| 2013/0270660 A1* | 10/2013 | Bryzek | B81C 1/00301 |
| | | | 438/51 |
| 2014/0264661 A1 | 9/2014 | Cheng et al. | |
| 2014/0319631 A1 | 10/2014 | Chu et al. | |
| 2016/0221819 A1 | 8/2016 | Smeys et al. | |
| 2017/0210618 A1 | 7/2017 | Chang et al. | |
| 2021/0179419 A1 | 6/2021 | Cheng et al. | |
| 2022/0091157 A1* | 3/2022 | Visconti | B81C 1/0023 |

* cited by examiner

2900 ⇘

| Form a first plurality of stopper bumps on a top surface of a substrate and cure the first plurality of stopper bumps | —2902 |

↓

| Form a plurality of adhesive structures on the top surface of the substrate | —2904 |

↓

| Attach a MEMS structure to the substrate and cure the adhesive structures, where the first plurality of stopper bumps is disposed between the top surface of the substrate and a bottom surface of the MEMS structure | —2906 |

↓

| Form a second plurality of stopper bumps on a top surface of the MEMS structure and/or on a lower surface of a housing structure, and cure the second plurality of stopper bumps | —2908 |

↓

| Attach the housing structure to the substrate and perform a curing process, where the second plurality of stopper bumps is disposed between the lower surface of the housing structure and a top surface of the MEMS structure | —2910 |

Fig. 29

STOPPER BUMP STRUCTURES FOR MEMS DEVICE

REFERENCE TO RELATED APPLICATION

This application claims priority to U.S. Provisional Application No. 63/310,764 filed on Feb. 16, 2022, the contents of which are hereby incorporated by reference in their entirety.

BACKGROUND

Microelectromechanical systems (MEMS) is a technology that integrates miniaturized mechanical and electromechanical elements on an integrated chip. MEMS devices are often made using micro-fabrication techniques. In recent years, MEMS devices have found a wide range of applications. For example, MEMS devices are found in cell phones (e.g., accelerometers, gyroscopes, digital compasses, etc.), pressure sensors, micro-fluidic elements (e.g., valves, pumps), optical switches (e.g., mirrors), etc.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 29 illustrates a flowchart of some embodiments of a method for forming an IC comprising multiple stopper bump structures.

DETAILED DESCRIPTION

Figure 1:
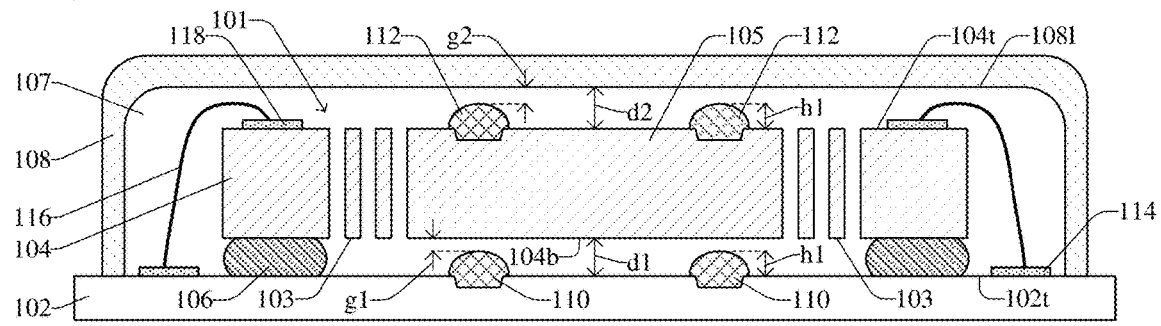
FIG. 1 illustrates a cross-sectional view of some embodiments of an integrated chip (IC) comprising multiple stopper bump structures.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower." "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

An integrated chip (IC) package may include a semiconductor die disposed on a substrate by an adhesive structure. A housing structure is attached to the substrate and provides protection to the semiconductor die. The semiconductor die may include a microelectromechanical systems (MEMS) device that comprises a movable structure disposed in a cavity defined between a lower surface of the housing structure and an upper surface of the substrate. During operation of the MEMS device, the movable structure deflects in proportion to external stimuli (e.g., motion, sound waves, etc.) between the lower surface of the housing structure and the upper surface of the substrate. The external stimuli can be quantified by measuring the deflection.

High force may be applied to the MEMS device during use of the IC package or during a shock and/or drop test. This may result in the movable structure hitting the lower surface of the housing structure or the upper surface of the substrate at a high speed, thereby damaging the MEMS device. In an effort to mitigate damage to the MEMS device, a stopper structure may be disposed on the MEMS device and is configured to limit movement of the movable structure between surfaces of the housing structure and the substrate. However, the stopper structure is typically formed by one or more thin film deposition process(es) (e.g., chemical vapor deposition (CVD), physical vapor deposition (PVD), etc.) such that the stopper structure is relatively thin (e.g., less than 5 micrometers). The relatively thin stopper structure is unable to sufficiently constrain movement of the movable structure between surfaces of the housing structure and the substrate, thereby resulting in damage to the movable structure and degradation of the MEMS device's performance. Further, stopper structures formed with the one or more thin film deposition process(es) to a larger thickness (e.g., greater than 10 micrometers) may suffer structural issues, such as cracking or peeling. This reduces a reliability and endurance of the MEMS device.

Accordingly, the present disclosure is directed towards an IC package comprising a MEMS device and a plurality of stopper bumps configured to increase performance of the MEMS device. The IC package includes the MEMS device overlying a substrate and a housing structure attached to the substrate, where the MEMS device is disposed between the substrate and housing structure. A first plurality of stopper bumps is disposed between the MEMS device and the substrate, and a second plurality of stopper bumps is disposed between the MEMS device and the housing structure. The first and second plurality of stopper bumps are formed to a relatively large thickness (e.g., greater than about 15 micrometers) by a suitable deposition process (e.g., screen printing, ink injection printing, and syringe dispensing) with high thickness control. The stopper bumps facilitate good gap control between the MEMS device and substrate and between the MEMS device and housing structure, such that movement of a movable structure in the MEMS device is sufficiently constrained. This increases an overall performance of the IC package.

FIG. 1 illustrates a cross-sectional view 100 of some embodiments of an integrated chip (IC) comprising multiple stopper bump structures.

The IC comprises a substrate 102, a microelectromechanical systems (MEMS) structure 104, and a housing structure 108. The MEMS structure 104 overlies the substrate 102. The substrate 102 provides mechanical support for the MEMS structure 104 and may electrically couple the MEMS structure 104 to other electronic devices (not shown). A first plurality of metal pads 114 is disposed on a top surface 102t of the substrate 102. In some embodiments, the substrate 102 may, for example, be or comprise an IC die, a printed circuit board (PCB), or some other suitable type of substrate. Multiple adhesive structures 106 are disposed on the top surface 102t of the substrate 102 and provide adhesion between the MEMS structure 104 and the substrate 102. The adhesive structures 106 may, for example, be or comprise epoxy glue or some other suitable adhesive(s). A second plurality of metal pads 118 is disposed on a top surface 104t of the MEMS structure 104. The first and second plurality of metal pads 114, 118 may, for examples, be or comprise iron, nickel, copper, gold, some other suitable conductive material(s), or any combination of the foregoing. In various embodiments, the MEMS structure 104 may, for example, be or comprise a semiconductor die, a semiconductor substrate, or some other integrated chip.

Metal wires 116 electrically couple the first plurality of metal pads 114 to the second plurality of metal pads 118 and facilitate electrical connection between the MEMS structure 104 and the substrate 102. The housing structure 108 overlies and provides protection to the MEMS structure 104. The housing structure 108 may laterally surround sidewalls of the MEMS structure 104. The housing structure 108 may, for example, be or comprise molded plastic, ceramic, some other suitable packaging material(s), or any combination of the foregoing. Further, the MEMS structure 104 is disposed within a cavity 107 defined between the top surface 102t of the substrate 102 and a lower surface 108l of the housing structure 108. In some embodiments, a first distance d1 between the top surface 102t of the substrate 102 and a bottom surface 104b of the MEMS structure 104 is, for example, greater than about 50 µm, within a range of about within a range of about 50 µm to 80 µm, or some other suitable value(s). In yet further embodiments, a second distance d2 between the top surface 104t of the MEMS structure 104 and the lower surface 108l of the housing structure 108 is, for example, greater than about 50 µm, within a range of about 50 µm to 80 µm, or some other suitable value(s).

In some embodiments, the MEMS structure 104 includes a MEMS device 101 that may, for example, be configured as an actuator, a motion sensor, a pressure sensor, a microphone, or other suitable MEMS device(s). In further embodiments, the MEMS device 101 comprises springs 103 and a movable element 105 disposed within the cavity 107. The springs 103 connect the movable element 105 to a peripheral region of the MEMS structure 104 (e.g., to one or more anchor structures defined by the MEMS structure 104) and suspend the movable element 105 within the cavity 107. During operation of the MEMS device 101, the movable element 105 deflects in proportion to external stimuli, such as motion or sound waves, applied to the movable element 105, whereby the external stimuli can be quantified by measuring the deflection. In some embodiments, the deflection is measured using capacitive coupling between a movable sensing electrode (not shown) supported by the movable element 105 and a fixed sensing electrode (not shown) neighboring the movable sensing electrode. The first and second plurality of metal pads 114, 118 may be electrically coupled to the movable sensing electrode and/or fixed sensing electrode and may output a signal comprising data related to the deflection of the movable element 105.

A first plurality of stopper bumps 110 is disposed between the MEMS structure 104 and the top surface 102t of the substrate 102, and a second plurality of stopper bumps 112 is disposed between the MEMS structure 104 and the lower surface 108l of the housing structure 108. In various embodiments, the first plurality of stopper bumps 110 is disposed on and/or within the top surface 102t of the substrate 102 and the second plurality of stopper bumps 112 is disposed on and/or within the top surface 104t of the MEMS structure 104. The first and second plurality of stopper bumps 110, 112 may, for example, be or comprise a polymer, epoxy, silicon, other suitable material(s), or any combination of the foregoing. The first and second plurality of stopper bumps 110, 112 each have a height h1 that is, for example, within a range of about 15 µm to 50 µm, or some other suitable value(s). In further embodiments, the first plurality of stopper bumps 110 is separated from the bottom surface 104b of the MEMS structure 104 by a first gap g1 that that has a height within a range of about 10 µm to 30 µm when the movable element 105 is at rest (i.e., when the movable element 105 is not in motion). In yet further embodiments, the second plurality of stopper bumps 112 is separated from the lower surface 108l of the housing structure 108 by a second gap g2 that has a height within a range of about 10 µm to 30 µm when the movable element is at rest (i.e., when the movable element 105 is not in motion). In some embodiments, the first plurality of stopper bumps 110 may be referred to as a plurality of lower stopper bumps and the second plurality of stopper bumps 112 may be referred to as a plurality of upper stopper bumps.

In various embodiments, the first and second plurality of stopper bumps 110, 112 are formed by a deposition process (e.g., screen printing, ink injection printing, and syringe dispensing) with high thickness control (e.g., forming the stopper bumps 110, 112 within a range of +/−10% of a target thickness) that facilitates accurately forming the stopper bumps 110, 112 with the relatively large height h1 (e.g., greater than about 15 µm). The stopper bumps 110, 112 having the relatively large height h1 promotes good gap control (i.e., accurately defining the heights of the first and second gaps g1, g2) between the MEMS structure 104 and the substrate 102 and between the MEMS structure 104 and the housing structure 108. This, in part, facilitates sufficiently constraining movement of the movable element 105, thereby mitigating damage to the movable element 105 and degradation of performance of the MEMS device 101. Thus, the good gap control increases an overall performance and endurance of the MEMS structure 104.

Figure 2:
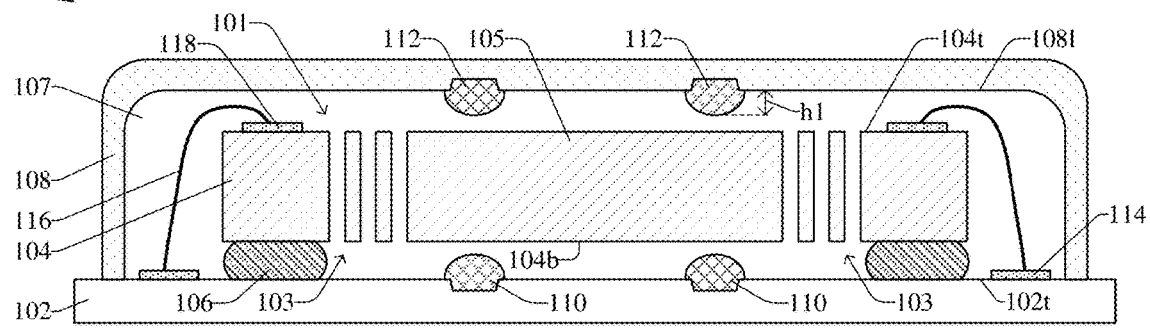
FIGS. 2 and 3 illustrates cross-sectional views of some alternative embodiments of the IC of FIG. 1.

FIG. 2 illustrates a cross-sectional view 200 of some alternative embodiments of the IC of FIG. 1, in which the second plurality of stopper bumps 112 is disposed on and/or within the lower surface 108l of the housing structure 108. In various embodiments, the second plurality of stopper bumps 112 directly overlies the top surface 104t of the MEMS structure 104.

Figure 3:
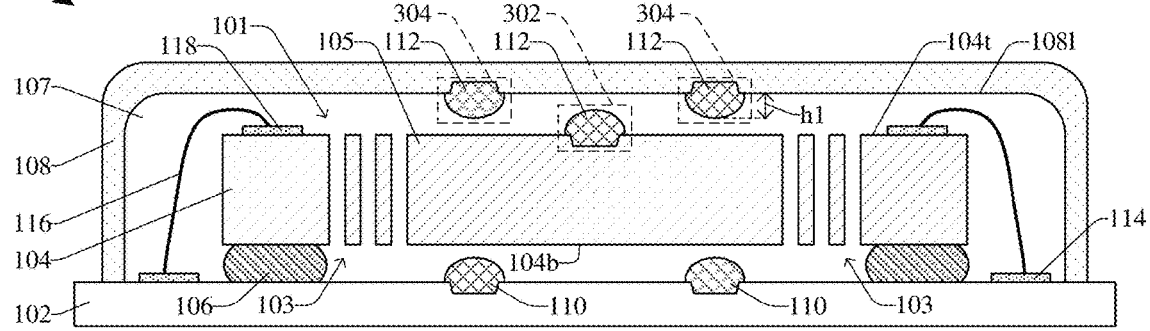

FIG. 3 illustrates a cross-sectional view 300 of some alternative embodiments of the IC of FIG. 1, in which the second plurality of stopper bumps 112 comprises a first subset of stopper bumps 302 disposed on and/or within the top surface 104t of the MEMS structure 104 and a second subset of stopper bumps 304 disposed on and/or within the lower surface 108l of the housing structure 108. In various embodiments, the first subset of stopper bumps 302 may be spaced laterally between adjacent stopper bumps within the second subset of stopper bumps 304.

Figure 4:
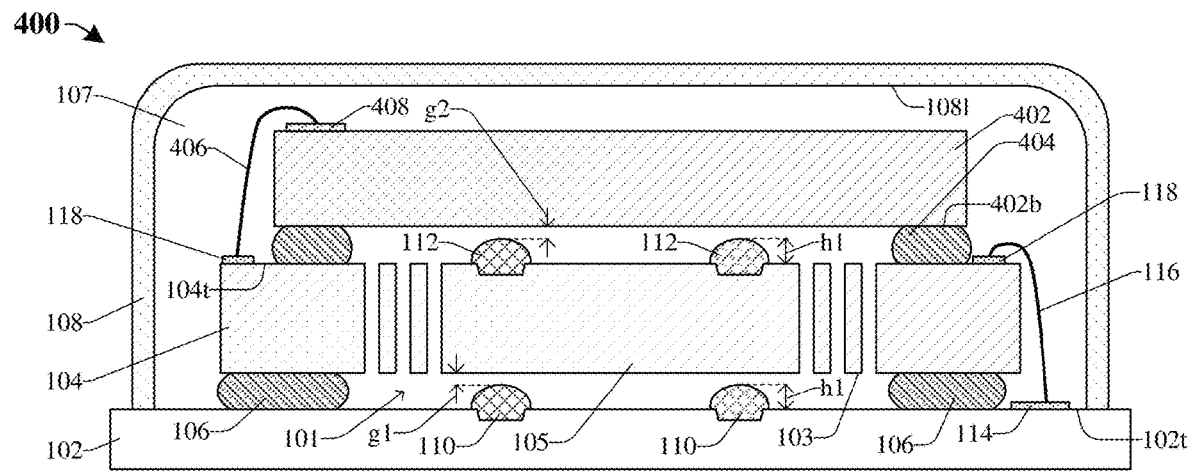
FIGS. 4 and 5 illustrates various cross-sectional views of some embodiments of an IC comprising stopper bumps disposed between stacked ICs.

FIG. 4 illustrates a cross-sectional view 400 of some embodiments of an IC comprising stopper bumps disposed between stacked ICs.

In some embodiments, the IC of FIG. 4 comprises a substrate 102, a MEMS structure 104, an upper semiconductor die 402, and a housing structure 108. The MEMS structure 104 is disposed over the substrate 102. A first plurality of metal pads 114 is disposed on a top surface 102t of the substrate 102. Further, multiple adhesive structures 106 are disposed between the substrate 102 and the MEMS structure 104. In various embodiments, the MEMS structure 104 comprising a MEMS device 101 that may, for example, include a movable element 105 suspended in a cavity 107 by springs 103. A second plurality of metal pads 118 is disposed on a top surface 104t of the MEMS structure 104. A metal wire 116 couples the first plurality of metal pads 114 to the second plurality of metal pads 118.

A plurality of upper adhesive structures 404 is disposed on the top surface 104t of the MEMS structure 104 and is configured to adhere the MEMS structure 104 to the upper semiconductor die 402. The upper adhesive structures 404 may, for example, be or comprise epoxy glue or some other suitable adhesive(s). An upper metal pad 408 overlies the upper semiconductor die 402. The upper metal pad 408 may, for example, be or comprise iron, nickel, copper, gold, some other suitable conductive material(s), or any combination of the foregoing. Further, an upper metal wire 406 couples the upper metal pad 408 to the second plurality of metal pads 118. In various embodiments, the upper semiconductor die 402 may, for example, be or comprise a MEMS structure, a semiconductor substrate, or some other integrated chip. Further, the housing structure 108 overlies the upper semiconductor die 402 such that the upper semiconductor die 402 and the MEMS structure 104 are disposed within a cavity 107 that is defined between the top surface 102t of the substrate 102 and a lower surface 108l of the housing structure 108.

In some embodiments, a first plurality of stopper bumps 110 is disposed within and/or on the top surface 102t of the substrate 102, and a second plurality of stopper bumps 112 is disposed within and/or on a top surface 104t of the MEMS structure 104. The first and second plurality of stopper bumps 110, 112 each have a height h1 that is relatively large (e.g., greater than about 15 µm) and facilitates good gap control between the MEMS structure 104 and the substrate 102 and between the MEMS structure 104 and the upper semiconductor die 402. This mitigates damage to the movable element 105 and increases an overall performance and endurance of the MEMS structure 104.

Figure 5:
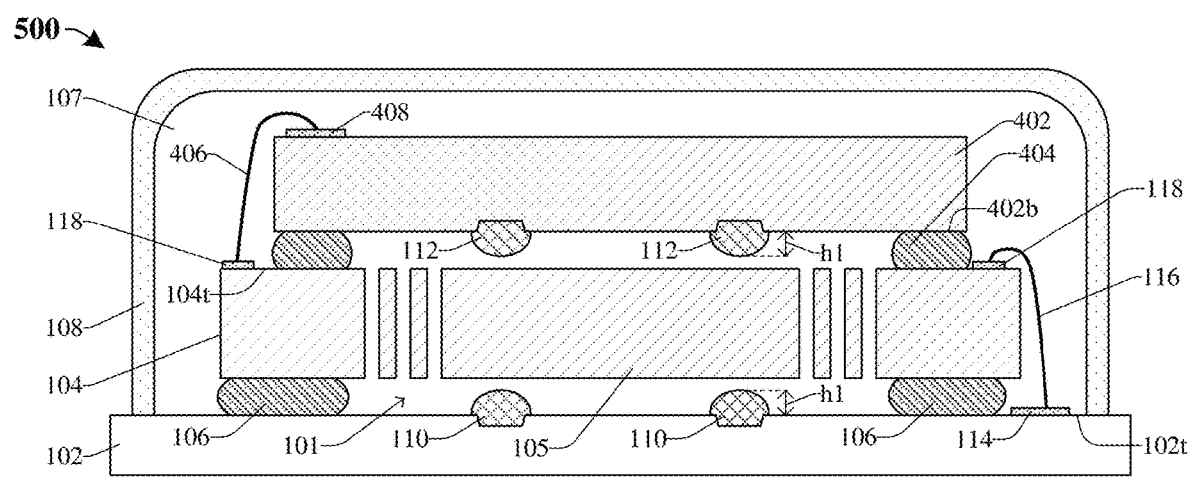

FIG. 5 illustrates a cross-sectional view 500 of some alternative embodiments of the IC of FIG. 4, in which the second plurality of stopper bumps 112 is disposed within and/or on a bottom surface 402b of the upper semiconductor die 402. In various embodiments, the second plurality of stopper bumps 112 directly overlies the top surface 104t of the MEMS structure 104.

Figure 6:
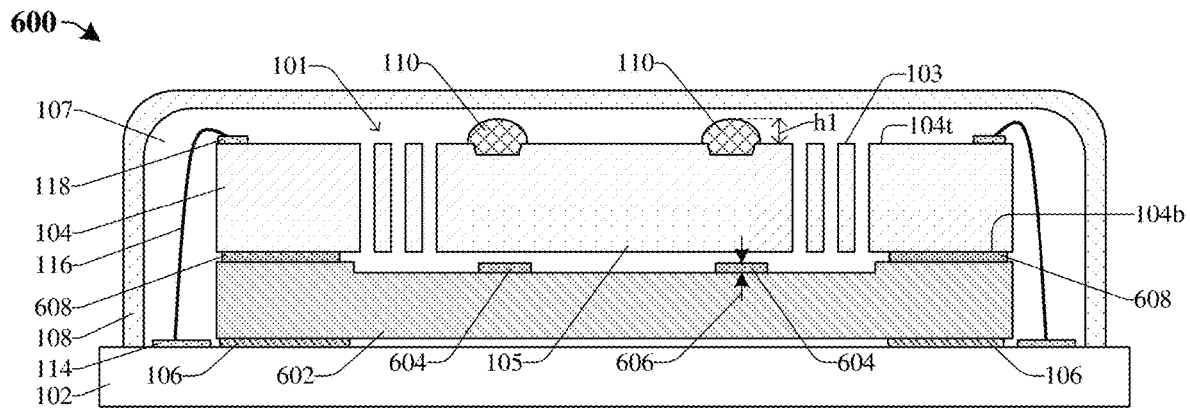
FIGS. 6 and 7 illustrate various cross-sectional views of some embodiments of an IC comprising a capping structure and multiple stopper bump structures.

FIG. 6 illustrates a cross-sectional view 600 of some embodiments of an IC comprising multiple stopper bump structures.

In some embodiments, the IC comprises a substrate 102, a MEMS structure 104, a capping structure 602, and a housing structure 108. Adhesive structures 106 are disposed between the capping structure 602 and the substrate 102, where the adhesive structures 106 adhere the capping structure 602 to the substrate 102. A first plurality of metal pads 114 is disposed on the substrate 102. Further, a bonding structure 608 is disposed between the capping structure 602 and the MEMS structure 104, where the MEMS structure 104 meets the bonding structure 608 at a bond interface. The bonding structure 608 may, for example, be or comprise an oxide, silicon dioxide, other suitable dielectric material(s), or any combination of the foregoing. The MEMS structure 104 comprises a MEMS device 101 that may, for example, include a movable element 105 suspended in a cavity 107 by springs 103. A second plurality of metal pads 118 is disposed on a top surface 104t of the MEMS structure 104. Metal wires 116 couple the first plurality of metal pads 114 to the second plurality of metal pads 118. The housing structure 108 overlies the MEMS structure 104 and laterally surrounds the MEMS structure 104 and the capping structure 602.

In some embodiments, a plurality of stopper structures 604 is disposed on an upper surface of the capping structure 602 and directly underlies the MEMS structure 104. The stopper structures 604 may be configured to constrain a movement of the movable element 105, thereby mitigating damage to the movable element 105 and increasing an overall performance of the MEMS device 101. The stopper structures 604 each have a thickness 606 that may, for example, be within a range of about 1 μm to 5 μm or some other suitable value(s). The stopper structures 604 may, for example, be or comprise silicon or some other suitable material(s). Further, a first plurality of stopper bumps 110 is disposed on and/or within a top surface 104t of the MEMS structure 104. In various embodiments, the first plurality of stopper bumps 110 comprise a different material than the stopper structures 604. In yet further embodiments, a thickness of the first plurality of stopper bumps 110 is greater than the thickness 606 of the stopper structures 604. In further embodiments, the plurality of stopper structures 604 is part of the capping structure 602, such that the stopper structures 604 and capping structure 602 comprise a same material (e.g., silicon).

Figure 7:
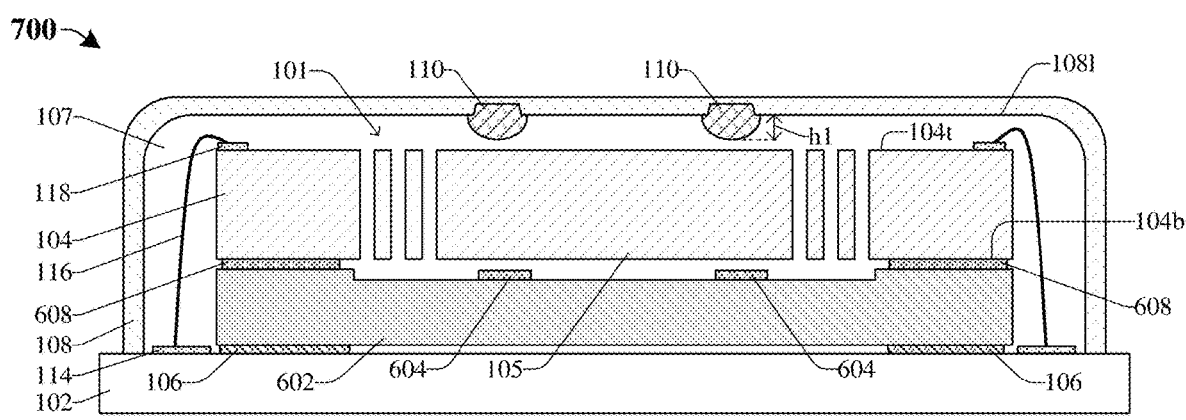

FIG. 7 illustrates a cross-sectional view 700 of some alternative embodiments of the IC of FIG. 6, in which the first plurality of stopper bumps 110 is disposed within and/or on a lower surface 108l of the housing structure 108. In various embodiments, the first plurality of stopper bumps 110 directly overlies the top surface 104t of the MEMS structure 104.

Figure 8:
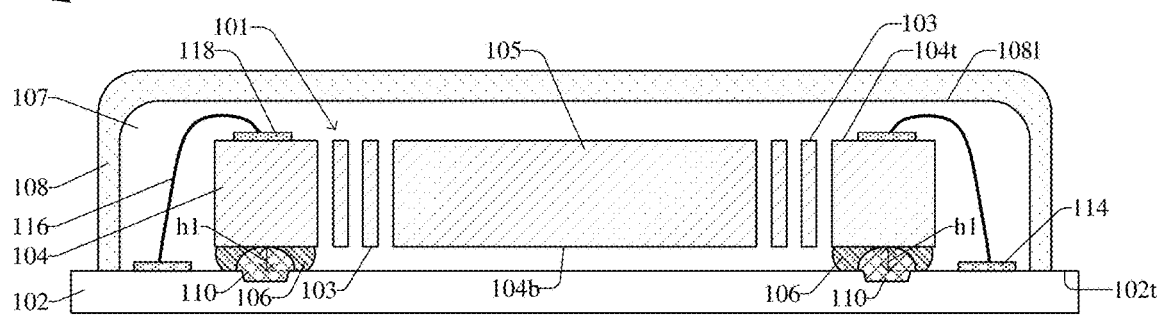
FIG. 8 illustrates a cross-sectional view of some embodiments of an IC comprising multiple stopper bumps structures.

FIG. 8 illustrates a cross-sectional view 800 of some embodiments of an IC comprising multiple stopper bump structures.

The IC comprises a substrate 102, a MEMS structure 104, and a housing structure 108. A first plurality of stopper bumps 110 is disposed on and/or within a top surface 102t of the substrate 102 and directly underlie the MEMS structure 104. Further, adhesive structures 106 are disposed on and/or around the first plurality of stopper bumps 110. In various embodiments, the first plurality of stopper bumps 110 and the adhesive structures 106 directly contact the MEMS structure 104 and the substrate 102. The MEMS structure 104 may comprise a MEMS device 101 that may, for example, include a movable element 105 suspended in a cavity 107 by springs 103. A first plurality of metal pads 114 is disposed on the substrate 102 and a second plurality of metal pads 118 is disposed on a top surface 104t of the MEMS structure 104. Further, metal wires 116 electrically couple the first plurality of metal pads 114 to the second plurality of metal pads 118.

In various embodiments, the first plurality of stopper bumps 110 are each accurately formed to a height h1 that is relatively large (e.g., greater than about 15 μm), such that the stopper bumps 110 promote good gap control between a bottom surface 104b of the MEMS structure and the top surface 102t of the substrate 102. In some embodiments, the height h1 is, for example within a range of about 15 μm to 50 μm or some other suitable value(s). Further, the first plurality of stopper bumps 110 is formed by a fabrication process with high thickness control (e.g., forming the stopper bumps 110 within a range of +/−10% of a target thickness) such that disposing the MEMS structure 104 on the first plurality of stopper bumps 110 mitigates a tilt of the MEMS structure 104 relative to the top surface 102t of the substrate 102. This reduces a time and cost associated with fabricating the IC and increases and overall performance of the MEMS device 101.

Figure 9:
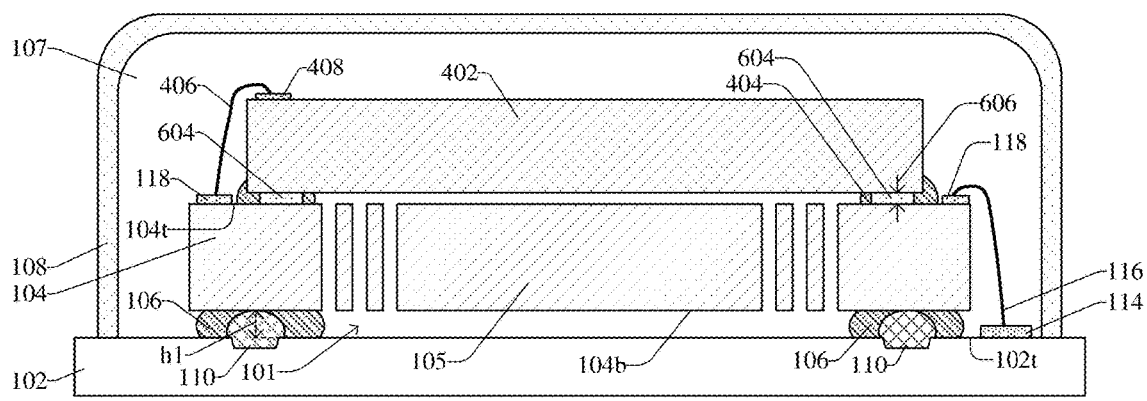
FIG. 9 illustrates a cross-sectional view of some embodiments of an IC comprising stopper bumps disposed between stacked ICs.

FIG. 9 illustrates a cross-sectional view 900 of some alternative embodiments of the IC of FIG. 8, in which the IC further comprises an upper semiconductor die 402 attached to the MEMS structure 104.

A plurality of stopper structures 604 is disposed on the top surface 104t of the MEMS structure 104. A plurality of upper adhesive structures 404 is disposed between the upper semiconductor die 402 and the MEMS structure 104. The upper adhesive structures 404 are disposed on/around the stopper structures 604. The stopper structures 604 may be configured to set a distance between the top surface 104t of the MEMS structure 104 and a bottom surface of the upper semiconductor die 402. The stopper structures 604 each have a thickness 606 that may, for example, be within a range of about 1 μm to 5 μm or some other suitable value(s). The stopper structures 604 may, for example, be or comprise silicon or some other suitable material(s). An upper metal pad 408 is disposed on a top surface of the upper semiconductor die 402. An upper metal wire 406 is configured to electrically couple the second plurality of metal pads 118 to the upper metal pad 408. The housing structure 108 overlies and surrounds the upper semiconductor die 402.

Figure 10A:
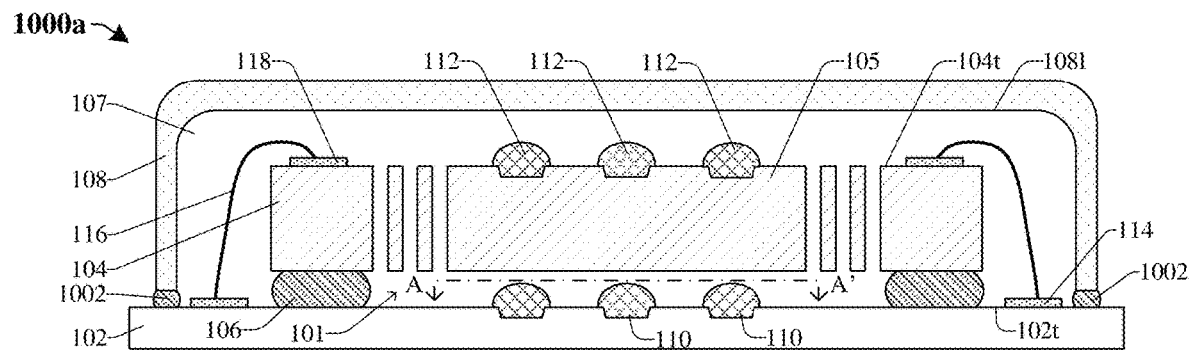
FIGS. 10A and 10B illustrate a cross-sectional view and top view of some embodiments of an IC comprising multiple stopper bump structures.

FIG. 10A illustrates a cross-sectional view 1000a of some alternative embodiments of the IC of FIG. 1.

The first plurality of stopper bumps 110 is disposed within and/or on the top surface 102t of the substrate 102. The second plurality of stopper bumps 112 is disposed within and/or on the top surface 104t of the MEMS structure 104. In various embodiments, the first plurality of stopper bumps 110 and the second plurality of stopper bumps 112 respectively comprise an array of stopper bumps disposed in rows and columns. It will be appreciated that although FIG. 10A illustrates the first and second plurality of stopper bumps 110, 112 respectively comprising three stopper bumps, any number of stopper bumps may be disposed in the first plurality of stopper bumps 110 and the second plurality of stopper bumps 112.

Multiple housing adhesive structures 1002 are disposed between the substrate 102 and the housing structure 108. The housing adhesive structures 1002 are configured to provide adhesion between the housing structure 108 and the substrate 102. The housing adhesive structures 1002 may, for example, be or comprise epoxy glue or some other suitable adhesive(s). While the housing adhesive structures 1002 are illustrated in embodiments of the IC of FIG. 10A, it is to be understood that the housing adhesive structures 1002 may be used with embodiments of the IC in any one of FIGS. 1-9 and the associated method(s). As such, the housing adhesive structures 1002 may be between the housing structure 108 and the substrate 102 in any one of FIGS. 1-9, 21, 24, 28, 36, 41, 53, 57, 64, and 69.

Figure 10B:
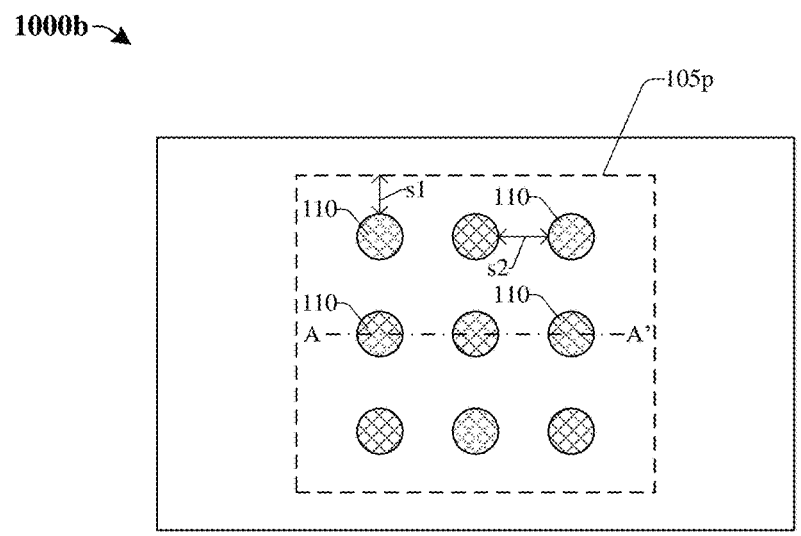

FIG. 10B illustrates a top view 1000b of some embodiments of the IC of FIG. 10A taken along the line A-A', where the first plurality of stopper bumps 110 comprises an array of stopper bumps disposed in rows and columns. In various embodiments, each stopper bump in the first plurality of stopper bumps 110 is, for example, circular when viewed from above. In further embodiments, the stopper bumps 110 are laterally offset from an outer perimeter 105p of the movable element (105 of FIG. 10A) by a first distance s1 that is, for example, within a range of about 200 μm to 400 μm or some other suitable value(s). In yet further embodiments, the stopper bumps 110 are laterally offset from one another by a second distance s2 that is, for example, within a range of about 200 µm to 400 µm or some other suitable value(s).

Figure 11:
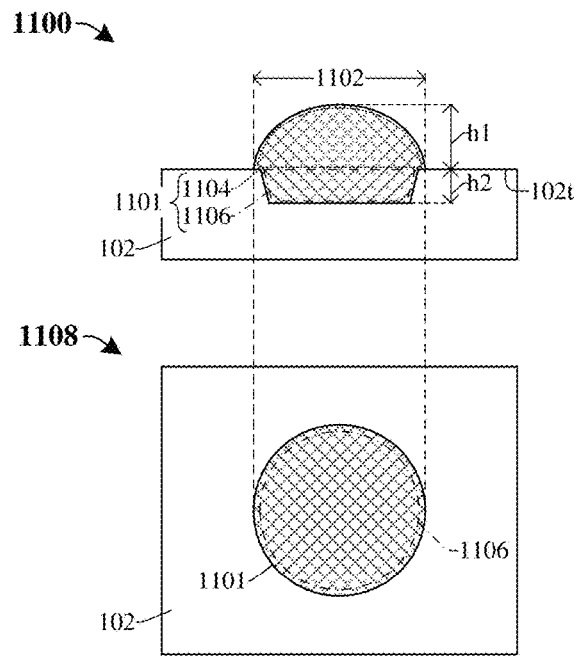
FIG. 11 illustrates a cross-sectional view and top view of some embodiments of a stopper bump.

FIG. 11 illustrates a cross-sectional view 1100 and a top view 1108 of some embodiments of a stopper bump 1101. The stopper bump 1101 of FIG. 11 may, for example, correspond to the stopper bumps of FIGS. 1-10B.

The stopper bump 1101 comprises an upper body 1104 over the substrate 102 and a lower body 1106 disposed within the substrate 102. It will be appreciated that although FIG. 11 illustrates the lower body 1106 of the stopper bump 1101 being disposed within the substrate 102, the lower body 1106 of the stopper bump 1101 may be disposed within a MEMS structure (e.g., 104 of FIG. 1), a housing structure (e.g., 108 of FIG. 2), or another suitable structure. In some embodiments, the stopper bump 1101 has a width 1102 that may, for example, be within a range of about 200 µm to 400 µm or some other suitable value(s). Further the width 1102 of may correspond to a diameter of the stopper bump 1101. The stopper bump 1101 has a height h1 defined between a top surface 102t of the substrate 102 and a top surface of the stopper bump 1101 and a lower height h2 defined between the top surface 102t of the substrate 102 and a bottom surface of the stopper bump 1101. The height h1 may correspond to a height of the upper body 1104 and the lower height h2 may correspond to a height of the lower body 1106. In some embodiments, the height h1 may, for example, be within a range of about 15 µm to 50 µm or some other suitable value(s). In yet further embodiments, the lower height h2 may, for example, be within a range of about 10 µm to 50 µm or some other suitable value(s). In various embodiments, the height h1 is greater than the lower height h2.

Figure 12A:
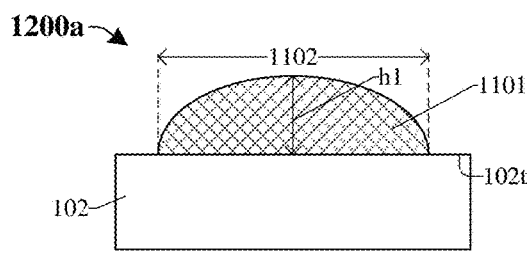
FIGS. 12A-12C illustrate cross-sectional views of various embodiments of a stopper bump.
Figure 12B:
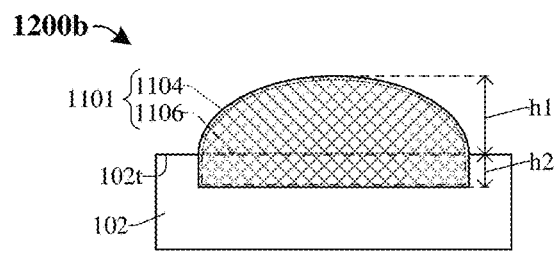
Figure 12C:
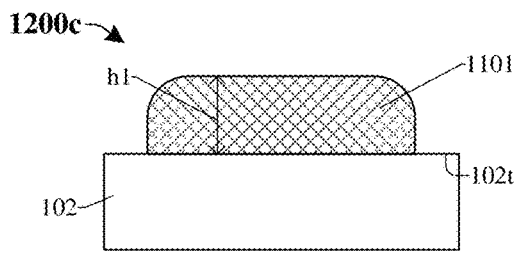

FIGS. 12A-12C illustrate cross-sectional views 1200a-c of various embodiments of a stopper bump 1101. The stopper bump 1101 of FIGS. 12A-12C may, for example, correspond to the stopper bumps of FIGS. 1-10B. As illustrated in the cross-sectional view 1200a of FIG. 12A, the lower body (1106 of FIG. 11) may be omitted such that a bottom surface of the stopper bump 1101 directly contacts the top surface 102t of the substrate 102. As illustrated in the cross-sectional view 1200b of FIG. 12B, the upper body 1104 of the stopper bump 1101 has a semicircular shape and the lower body 1106 has a rectangular shape. As illustrated in the cross-sectional view 1200c of FIG. 12C, the lower body (1106 of FIG. 11) may be omitted and the stopper bump 1101 has a flat top surface.

Figure 13A:
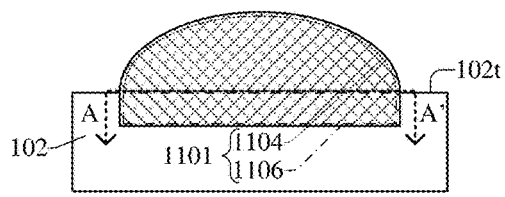
FIGS. 13A-13D illustrate various views of some embodiments of a stopper bump.
Figure 13B:
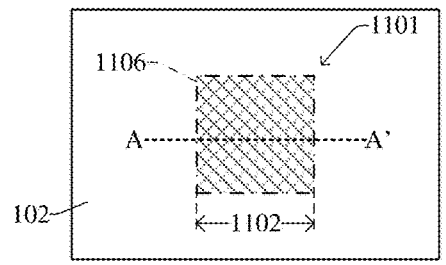
Figure 13C:
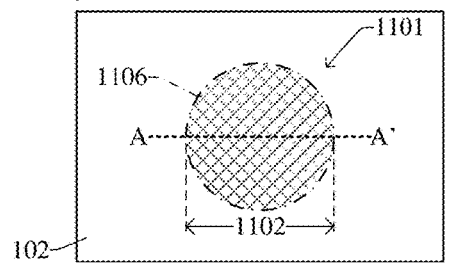
Figure 13D:
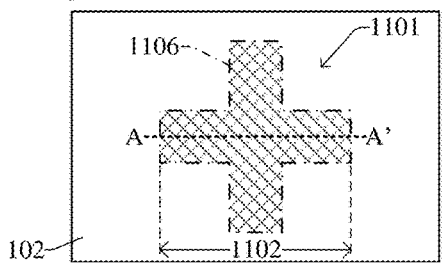

FIGS. 13A-13D illustrate various views of some embodiments of a stopper bump 1101. The stopper bump 1101 of FIGS. 13A-13D may, for example, correspond to the stopper bumps of FIGS. 1-10B. In various embodiments, FIG. 13A illustrates a cross-sectional view 1300a of the stopper bump 1101 and FIGS. 13B-D illustrate top views 1300b-d of various embodiments of the stopper bump 1101 taken along the line A-A'. As illustrated in the cross-sectional view 1300a of FIG. 13A, the stopper bump 1101 comprises an upper body 1104 and a lower body 1106. As illustrated in the top view 1300b of FIG. 13B, the lower body 1106 may have a square shape or a rectangular shape. As illustrated in the top view 1300c of FIG. 13C, the lower body 1106 may have a circular shape. As illustrated in the top view 1300d of FIG. 13D, the lower body 1106 may have a cross shape. In yet further embodiments, a width 1102 of the lower body 1106 may, for example, be within a range of about 200 µm to 400 µm or some other suitable value(s).

Figure 14A:
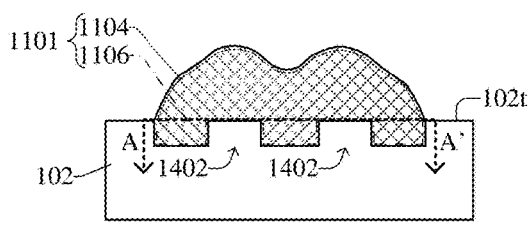
FIGS. 14A-14D illustrate various views of some embodiments of a stopper bump.
Figure 14B:
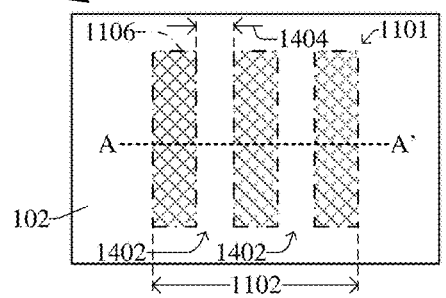
Figure 14C:
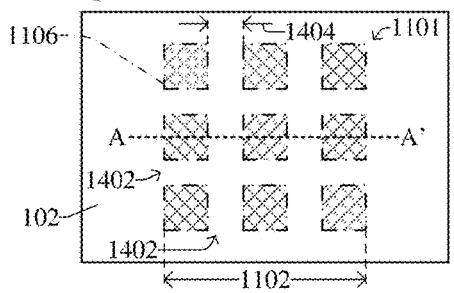
Figure 14D:
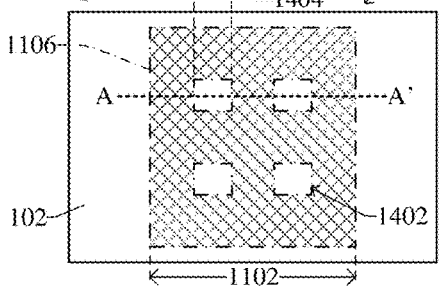

FIGS. 14A-14D illustrate various views of some embodiments of a stopper bump 1101. The stopper bump 1101 of FIGS. 14A-14D may, for example, correspond to the stopper bumps of FIGS. 1-10B. In various embodiments, FIG. 14A illustrates a cross-sectional view 1400a of the stopper bump 1101 and FIGS. 14B-D illustrate top views 1400b-d of various embodiments of the stopper bump 1101 taken along the line A-A'. As illustrated in the cross-sectional view 1400a of FIG. 14A, the stopper bump 1101 comprises an upper body 1104 and a lower body 1106 that comprises multiple lower segments disposed on opposing sides of segments 1402 of the substrate 102. As illustrated in the top view 1400b of FIG. 14B, the lower segments of the lower body 1106 have a rectangular shape and extend in parallel with one another. Further, the segments 1402 of the substrate 102 have a width 1404 that is, for example, within a range of about 40 µm to 80 µm or some other suitable value. As illustrated in the top view 1400c of FIG. 14C, the lower segments of the lower body 1106 have a rectangular shape or square shape and the segments 1402 of the substrate 102 are disposed in a grid layout. As illustrated in the top view 1400d of FIG. 14D, the lower body 1106 has a grid layout and laterally surrounds the segments 1402 of the substrate 102.

FIGS. 15-21 illustrate cross-sectional views 1500-2100 of some embodiments of a method for forming an IC comprising multiple stopper bump structures. The IC may, for example, correspond to the IC of FIG. 1. Although the cross-sectional views 1500-2100 shown in FIGS. 15-21 are described with reference to a method, it will be appreciated that the structures shown in FIGS. 15-21 are not limited to the method but rather may stand alone separate of the method. Furthermore, although FIGS. 15-21 are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 15:
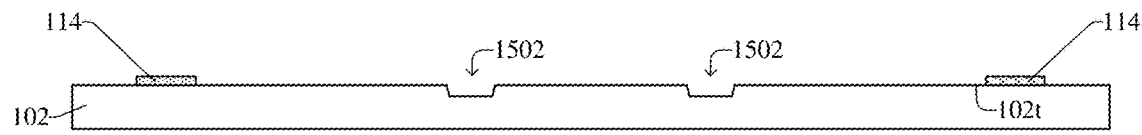
FIGS. 15-21 illustrate cross-sectional views of some embodiments of a method for forming an IC comprising multiple stopper bump structures.

As shown in cross-sectional view 1500 of FIG. 15, a substrate 102 is provided. A first plurality of metal pads 114 is formed on a top surface 102t of the substrate 102 and a plurality of stopper openings 1502 is formed in the substrate 102. In some embodiments, a process for forming the metal pads 114 includes: depositing (e.g., by CVD, PVD, atomic layer deposition (ALD), electroplating, electroless plating, etc.) a metal material over the substrate 102 and patterning the metal material. In further embodiments, a process for forming the plurality of stopper openings 1502 includes: forming a masking layer (not shown) over the top surface 102t of the substrate 102; etching the substrate 102 according to the masking layer; and performing a removal process to remove the masking layer.

Figure 16:
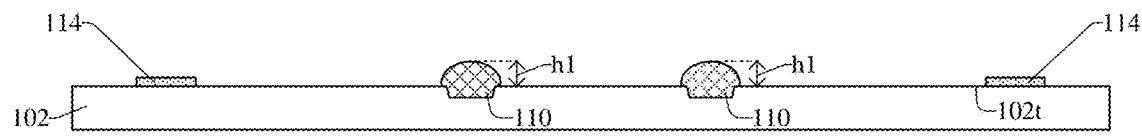

As shown in cross-sectional view 1600 of FIG. 16, a first plurality of stopper bumps 110 is formed along the top surface 102t of the substrate 102 and within the stopper openings (1502 of FIG. 15). The first plurality of stopper bumps 110 may be formed by a stopper bump fabrication process. The stopper bump fabrication process includes performing a deposition process (e.g., a screen printing process, a syringe dispensing process, an ink-jet printing process, etc.) with high thickness control (e.g., forming the stopper bumps 110 within a range of +/−10% of a target thickness) such that the stopper bumps 110 are each accurately formed to a height h1 that is relatively large (e.g., greater than about 15 µm). For example, a size of the stopper openings (1502 of FIG. 15), viscosity of the material deposited, drop pressure, and/or nozzle size may be adjusted to ensure the stopper bumps 110 are formed to the height h1 with high thickness control. In further embodiments, the stopper bump fabrication process may include fabrication of openings (e.g., the stopper openings 1502 of FIG. 15) before performing the aforementioned deposition process. The stopper bumps 110 may, for example, be or comprise polymer, epoxy, silicon, other suitable material(s), or any combination of the foregoing. In some embodiments, the height h1 is, for example, within a range of about 15 μm to 50 μm or some other suitable value(s). In various embodiments, after depositing the stopper bumps 110 by the deposition process (e.g., a screen printing process, a syringe dispensing process, an ink-jet printing process, etc.), the stopper bump fabrication process further includes performing a curing process to harden the stopper bumps 110. For example, the stopper bumps 110 may be deposited as a liquid and the curing process hardens the liquid of the stopper bumps 110 to a solid material. Accurately forming the stopper bumps 110 to the relatively large height h1 with good thickness control facilitates the stopper bumps 110 promoting good gap control.

Figure 17:
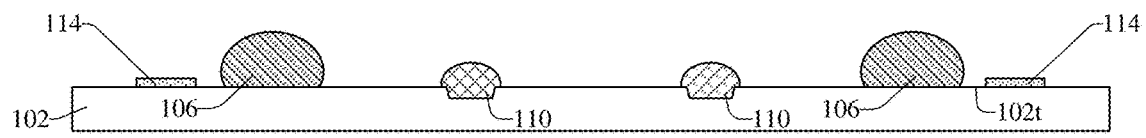

As shown in cross-sectional view 1700 of FIG. 17, a plurality of adhesive structures 106 is formed on the top surface 102t of the substrate 102. The adhesive structures 106 may, for example, be formed by squeezing, pumping, dispensing, or otherwise providing a liquid on the top surface 102t of the substrate 102 between the plurality of metal pads 114 and the first plurality of stopper bumps 110.

Figure 18:
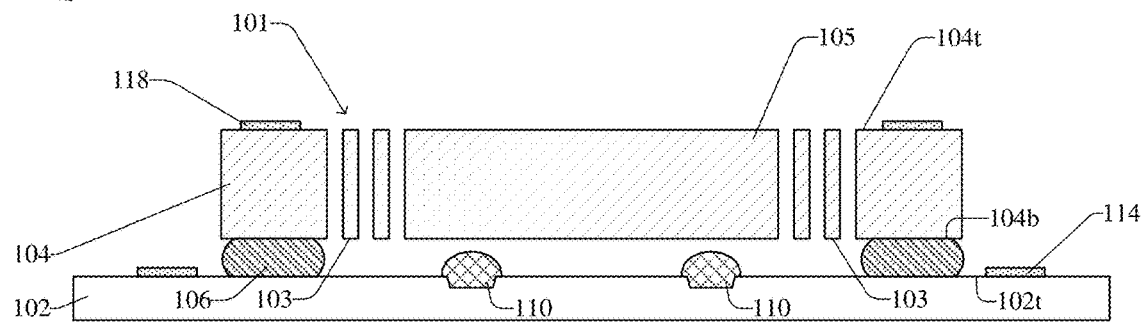

As shown in cross-sectional view 1800 of FIG. 18, a MEMS structure 104 is provided. In various embodiments, the MEMS structure 104 includes a second plurality of metal pads 118 disposed on a top surface 104t of the MEMS structure 104 and a MEMS device 101 that may, for example, comprise a movable element 105 and springs 103. A bottom surface 104b of the MEMS structure 104 is attached to the plurality of adhesive structures 106. In various embodiments, after the MEMS structure 104 is attached to the adhesive structures 106, a curing process is performed such that the liquid of the adhesive structures 106 hardens to a solid material.

Figure 19:
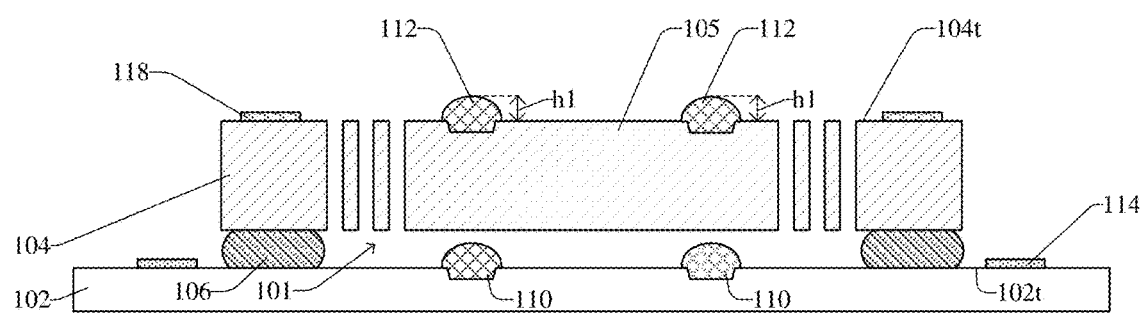

As shown in cross-sectional view 1900 of FIG. 19, a second plurality of stopper bumps 112 is formed on the top surface 104t of the MEMS structure 104. In various embodiments, the second plurality of stopper bumps 112 is formed by the stopper bump fabrication process illustrated and/or described in FIG. 16, such that the stopper bumps 112 are accurately formed to the height h1 which is, for example, within a range of about 15 μm to 50 μm or some other suitable value(s).

Figure 20:
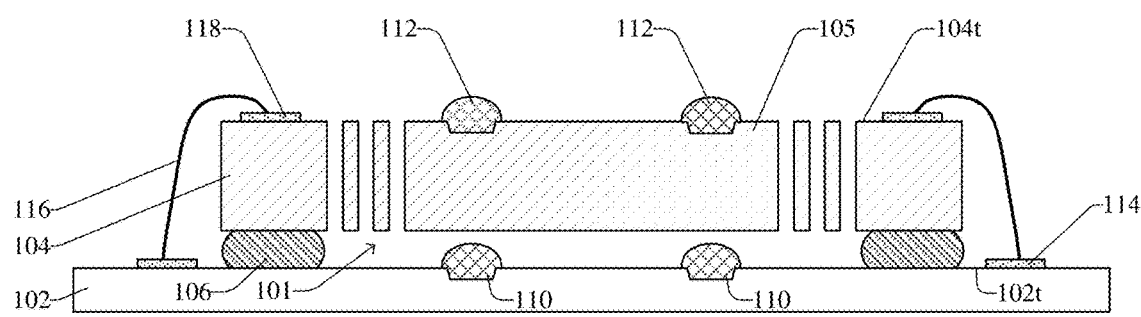

As shown in cross-sectional view 2000 of FIG. 20, metal wires 116 are formed and electrically couple the first plurality of metal pads 114 to the second plurality of metal pads 118. In various embodiments, the metal wires 116 may be formed by a wire bonding process or some other suitable process(es).

Figure 21:
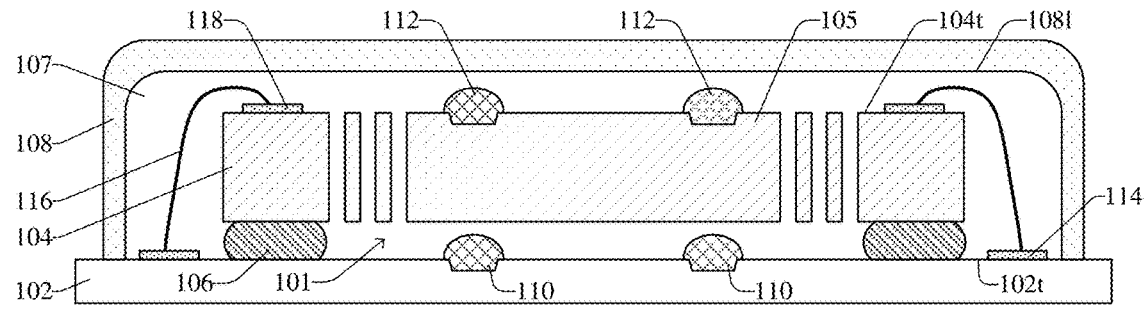

As shown in cross-sectional view 2100 of FIG. 21, a housing structure 108 is provided and attached to the substrate 102. A cavity 107 is defined between a lower surface 1081 of the housing structure 108 and the top surface 102t of the substrate 102. In various embodiments, attaching the housing structure 108 to the substrate 102 includes: depositing (e.g., by squeezing, pumping, dispensing, etc.) an adhesive material (not shown) on the top surface 102t of the substrate 102 and/or on a bottom surface of the housing structure 108; disposing the housing structure 108 on the substrate 102 such that the adhesive material is between the housing structure 108 and the substrate 102; and performing a curing process to harden the adhesive material.

Figure 22:
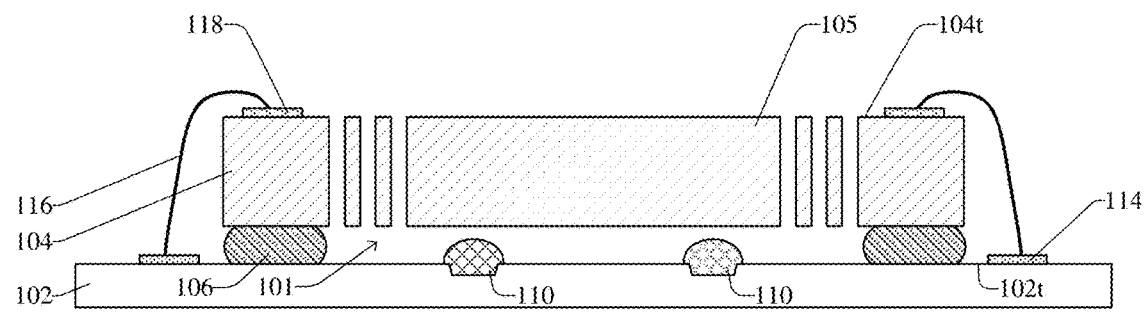
FIGS. 22-24 illustrate cross-sectional views of various embodiments of a method for forming an IC comprising multiple stopper bump structures.
Figure 23:
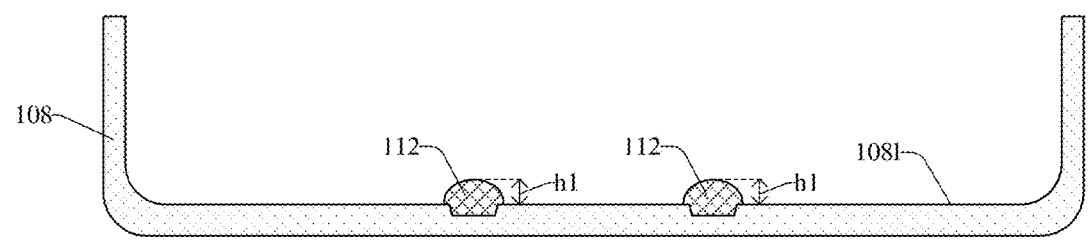
Figure 24:
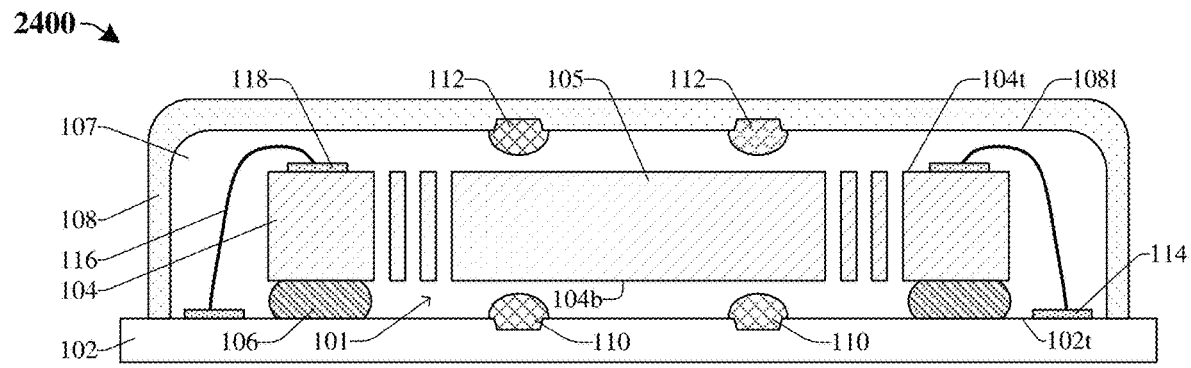

FIGS. 22-24 illustrate cross-sectional views 2200-2400 of some embodiments of a method for forming an IC comprising multiple stopper bump structures. The IC may, for example, correspond to the IC of FIG. 2. Although the cross-sectional views 2200-2400 shown in FIGS. 22-24 are described with reference to a method, it will be appreciated that the structures shown in FIGS. 22-24 are not limited to the method but rather may stand alone separate of the method. Furthermore, although FIGS. 22-24 are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

As shown in cross-sectional view 2200 of FIG. 22, a MEMS structure 104 is provided and attached to a substrate 102. A first plurality of stopper bumps 110 is formed on a top surface 102t of the substrate 102. The structure of FIG. 22 may, for example, be formed as illustrated and/or described in FIGS. 15-18. Further, metal wires 116 are formed by a wire bonding process and electrically couple the first plurality of metal pads 114 to the second plurality of metal pads 118.

As shown in cross-sectional view 2300 of FIG. 23, a housing structure 108 is provided and a second plurality of stopper bumps 112 is formed within and/or on a lower surface 1081 of the housing structure 108. In various embodiments, the second plurality of stopper bumps 112 is formed by the stopper bump fabrication process illustrated and/or described in FIG. 16, such that the stopper bumps 112 are accurately formed to the height h1 which is, for example, within a range of about 15 μm to 50 μm or some other suitable value(s).

As shown in cross-sectional view 2400 of FIG. 24, the housing structure 108 of FIG. 23 is attached to the substrate 102, such that the second plurality of stopper bumps 112 is disposed between the lower surface 1081 of the housing structure 108 and the MEMS structure 104. A cavity 107 is defined between the lower surface 1081 of the housing structure 108 and the top surface 102t of the substrate 102. In various embodiments, attaching the housing structure 108 to the substrate 102 includes: depositing (e.g., by squeezing, pumping, dispensing, etc.) an adhesive material (not shown) on the top surface 102t of the substrate 102 and/or on a bottom surface of the housing structure 108; disposing the housing structure 108 on the substrate 102 such that the adhesive material is between the housing structure 108 and the substrate 102; and performing a curing process to harden the adhesive material.

FIGS. 25-28 illustrate cross-sectional views 2500-2800 of some embodiments of a method for forming an IC comprising multiple stopper bump structures. The IC may, for example, correspond to the IC of FIG. 3. Although the cross-sectional views 2500-2800 shown in FIGS. 25-28 are described with reference to a method, it will be appreciated that the structures shown in FIGS. 25-28 are not limited to the method but rather may stand alone separate of the method. Furthermore, although FIGS. 25-28 are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 25:
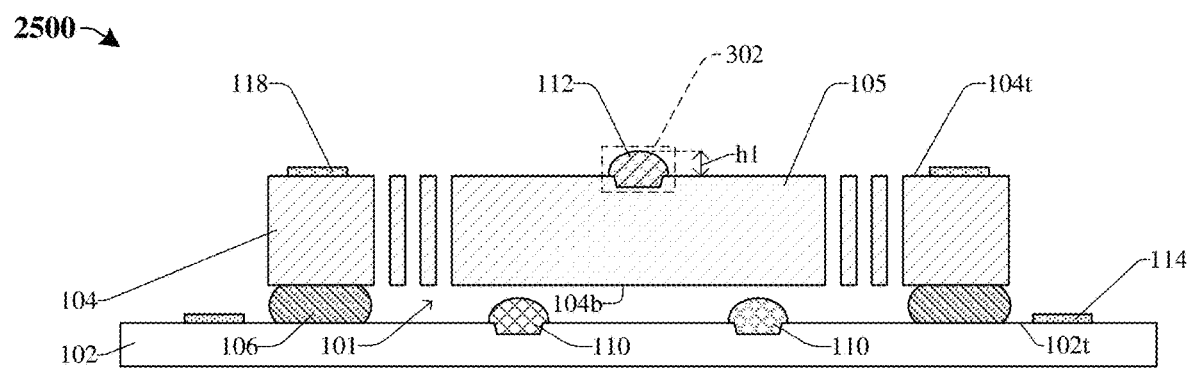
FIGS. 25-28 illustrate cross-sectional views of further embodiments of a method for forming an IC comprising multiple stopper bump structures.

As shown in cross-sectional view 2500 of FIG. 25, a MEMS structure 104 is provided and attached to a substrate 102. A first plurality of stopper bumps 110 is formed on a top surface 102t of the substrate 102. The structure of FIG. 25 may, for example, be formed as illustrated and/or described in FIGS. 15-18. Further, a first subset of stopper bumps 302 is formed on a top surface 104t of the MEMS structure 104. In various embodiments, the first subset of stopper bumps 302 is formed by the stopper bump fabrication process illustrated and/or described in FIG. 16, such that the stopper bumps are accurately formed to the height h1 which is, for example, within a range of about 15 µm to 50 µm or some other suitable value(s). In addition, the first subset of stopper bumps 302 is part of a second plurality of stopper bumps 112.

Figure 26:
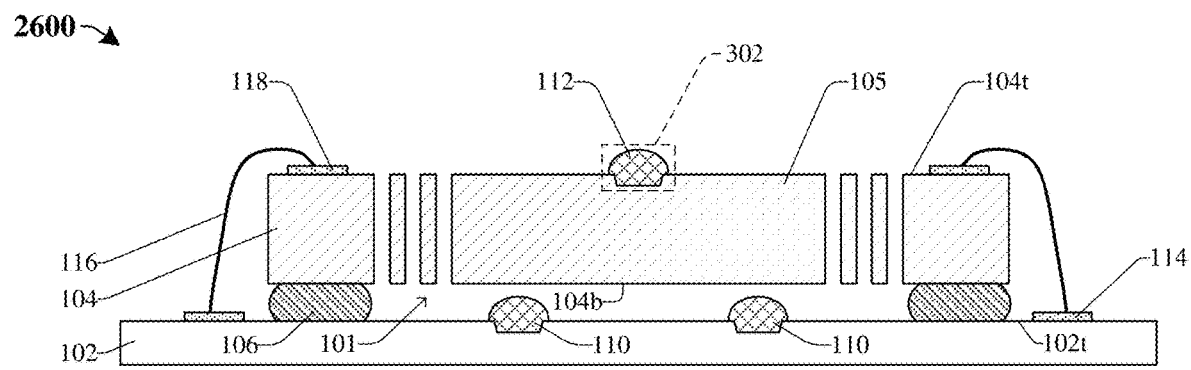

As shown in cross-sectional view 2600 of FIG. 26, metal wires 116 are formed and electrically couple the first plurality of metal pads 114 to the second plurality of metal pads 118. In various embodiments, the metal wires 116 may be formed by a wire bonding process or some other suitable process (cs).

Figure 27:
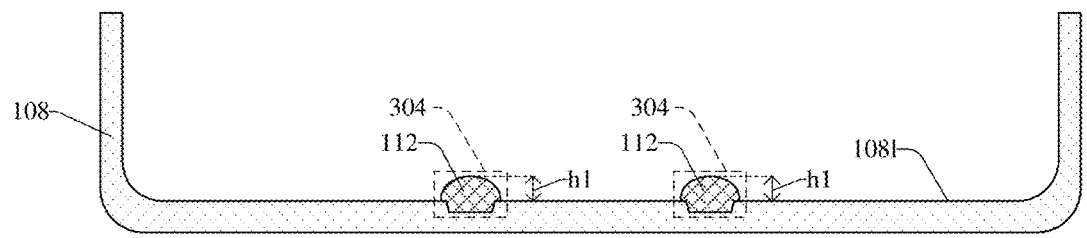

As shown in cross-sectional view 2700 of FIG. 27, a housing structure 108 is provided and a second subset of stopper bumps 304 is formed within and/or on a lower surface 108l of the housing structure 108. In various embodiments, the second subset of stopper bumps 304 is formed by the stopper bump fabrication process illustrated and/or described in FIG. 16, such that the stopper bumps are accurately formed to the height h1 which is, for example, within a range of about 15 µm to 50 µm or some other suitable value(s). The second subset of stopper bumps 304 is part of the second plurality of stopper bumps 112.

Figure 28:
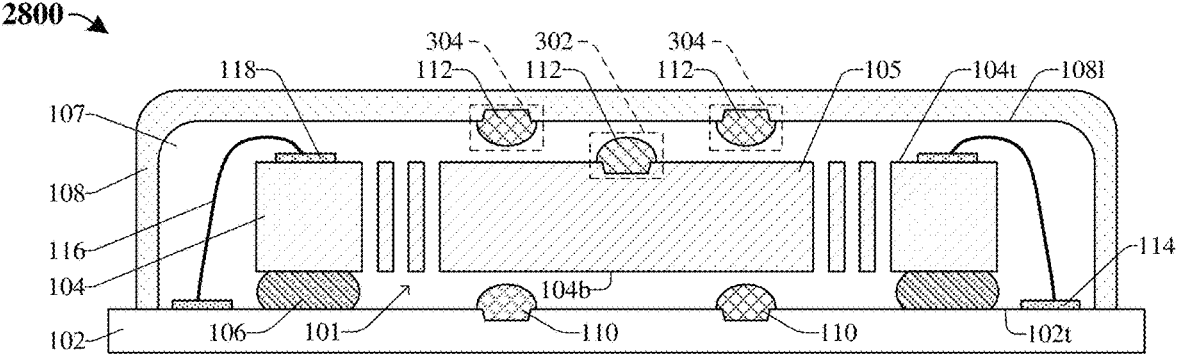

As shown in cross-sectional view 2800 of FIG. 28, the housing structure 108 of FIG. 27 is attached to the substrate 102, such that the second plurality of stopper bumps 112 is disposed between the housing structure 108 and the MEMS structure 104. A cavity 107 is defined between the lower surface 108l of the housing structure 108 and the top surface 102t of the substrate 102. In various embodiments, attaching the housing structure 108 to the substrate 102 includes: depositing (e.g., by squeezing, pumping, dispensing, etc.) an adhesive material (not shown) on the top surface 102t of the substrate 102 and/or on a bottom surface of the housing structure 108; disposing the housing structure 108 on the substrate 102 such that the adhesive material is between the housing structure 108 and the substrate 102; and performing a curing process to harden the adhesive material.

FIG. 29 illustrates a flowchart 2900 of some embodiments of a method for forming an IC comprising multiple stopper bump structures. Although the flowchart 2900 is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 2902, a first plurality of stopper bumps is formed on a top surface of a substrate and the first plurality of stopper bumps is cured. FIGS. 15 and 16 illustrate cross-sectional views 1500 and 1600 corresponding to various embodiments of act 2902.

At act 2904, a plurality of adhesive structures is formed on the top surface of the substrate. FIG. 17 illustrates cross-sectional view 1700 corresponding to various embodiments of act 2904.

At act 2906, a MEMS structure is attached to the substrate and the adhesive structures are cured. The first plurality of stopper bumps is disposed between the top surface of the substrate and a bottom surface of the MEMS structure. FIG. 18 illustrates cross-sectional view 1800 corresponding to various embodiments of act 2906.

At act 2908, a second plurality of stopper bumps is formed on a top surface of the MEMS structure and/or on a lower surface of a housing structure, and the second plurality of stopper bumps is cured. FIG. 19 illustrates cross-sectional view 1900 corresponding to various embodiments of act 2908. FIG. 23 illustrates cross-sectional view 2300 corresponding to some embodiments of act 2908. FIGS. 25 and 27 illustrate cross-sectional views 2500 and 2700 corresponding to other embodiments of act 2908.

At act 2910, the housing structure is attached to the substrate and a curing process is performed, where the second plurality of stopper bumps is disposed between the lower surface of the housing structure and a top surface of the MEMS structure. FIG. 21 illustrates cross-sectional view 2100 corresponding to various embodiments of act 2910. FIG. 24 illustrates cross-sectional view 2400 corresponding to some embodiments of act 2910. FIG. 28 illustrates cross-sectional view 2800 corresponding to other embodiments of act 2910.

FIGS. 30-36 illustrate cross-sectional views 3000-3600 of some embodiments of a method for forming an IC comprising stopper bumps disposed between stacked ICs. The IC may, for example, correspond to the IC of FIG. 4. Although the cross-sectional views 3000-3600 shown in FIGS. 30-36 are described with reference to a method, it will be appreciated that the structures shown in FIGS. 30-36 are not limited to the method but rather may stand alone separate of the method. Furthermore, although FIGS. 30-36 are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 30:
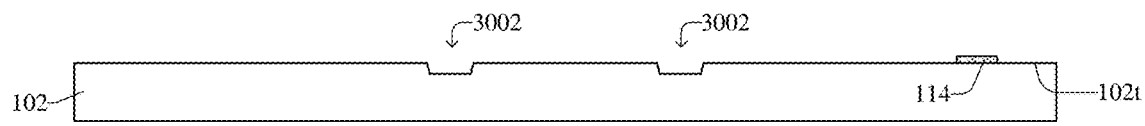
FIGS. 30-36 illustrate cross-sectional views of some embodiments of a method for forming an IC comprising stopper bumps disposed between stacked ICs.

As shown in cross-sectional view 3000 of FIG. 30, a substrate 102 is provided. A first metal pad 114 is formed on a top surface 102t of the substrate 102 and a plurality of stopper openings 3002 is formed in the substrate 102. In some embodiments, a process for forming the metal pad 114 includes: depositing (e.g., by CVD, PVD, ALD, electroplating, electroless plating, etc.) a metal material over the substrate 102 and patterning the metal material. In further embodiments, a process for forming the plurality of stopper openings 3002 includes: forming a masking layer (not shown) over the top surface 102t of the substrate 102; etching the substrate 102 according to the masking layer; and performing a removal process to remove the masking layer.

Figure 31:
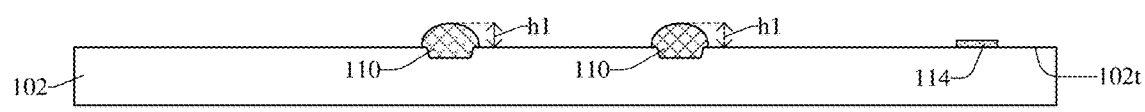

As shown in cross-sectional view 3100 of FIG. 31, a first plurality of stopper bumps 110 is formed along the top surface 102t of the substrate 102 and within the stopper openings (3002 of FIG. 30). The first plurality of stopper bumps 110 may be formed by a stopper bump fabrication process. The stopper bump fabrication process includes performing a deposition process (e.g., a screen printing process, a syringe dispensing process, an ink-jet printing process, etc.) with high thickness control (e.g., forming the stopper bumps 110 within a range of +/−10% of a target thickness) such that the stopper bumps 110 are each accurately formed to a height h1 that is relatively large (e.g., greater than about 15 µm). For example, a size of the stopper openings (3002 of FIG. 30), viscosity of the material deposited, drop pressure, and/or nozzle size may be adjusted to ensure the stopper bumps 110 are formed to the height h1 with high thickness control. In further embodiments, the stopper bump fabrication process may include fabrication of openings (e.g., the stopper openings 3002 of FIG. 30) before performing the aforementioned deposition process. The stopper bumps 110 may, for example, be or comprise polymer, epoxy, silicon, other suitable material(s), or any combination of the foregoing. In some embodiments, the height h1 is, for example, within a range of about 15 µm to 50 µm or some other suitable value(s). In various embodiments, after depositing the stopper bumps 110 by the deposition process (e.g., a screen printing process, a syringe dispensing process, an ink-jet printing process, etc.), the stopper bump fabrication process further includes performing a curing process to harden the stopper bumps 110. For example, the stopper bumps 110 may be deposited as a liquid and the curing process hardens the liquid of the stopper bumps 110 to a solid material. Accurately forming the stopper bumps 110 to the relatively large height h1 with good thickness control facilitates the stopper bumps 110 promoting good gap control.

Figure 32:
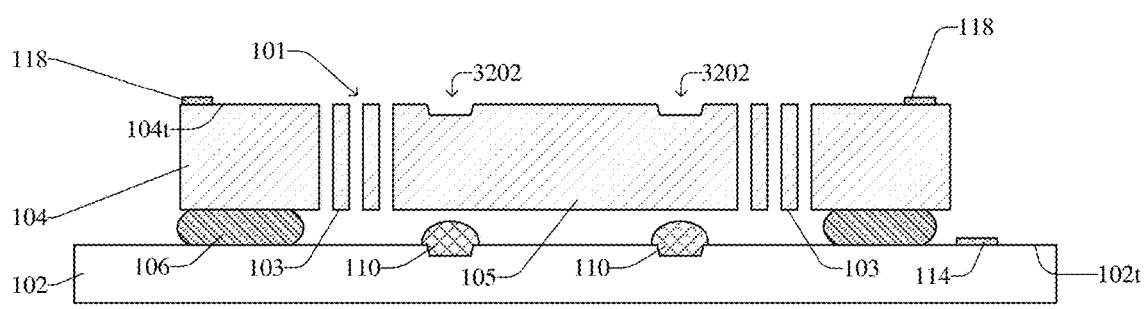

As shown in cross-sectional view 3200 of FIG. 32, a MEMS structure 104 is provided and attached to the substrate 102. In various embodiments, attaching the MEMS structure 104 to the substrate 102 includes: forming a plurality of adhesive structures 106 on the top surface 102t of the substrate; placing the MEMS structure 104 on the adhesive structures 106; and performing a curing process to harden the adhesive structures 106. The adhesive structures 106 may, for example, be formed by squeezing, pumping, dispensing, or otherwise providing a liquid on the top surface 102t of the substrate 102. In some embodiments, the curing process hardens the liquid of the adhesive structures 106 to a solid. In various embodiments, the MEMS structure 104 includes a second plurality of metal pads 118 disposed on a top surface 104t of the MEMS structure 104 and a MEMS device 101 that may, for example, comprise a movable element 105 and springs 103. In further embodiments, an etching process is performed on the MEMS structure 104 to form a plurality of upper stopper openings 3202 in the top surface 104t of the MEMS structure 104.

Figure 33:
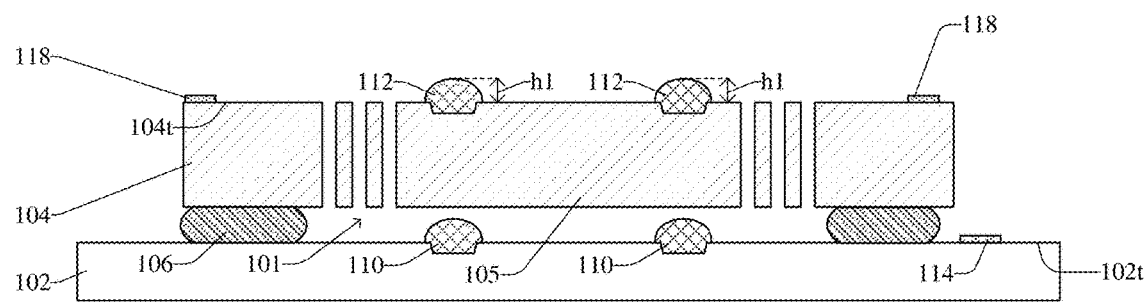

As shown in cross-sectional view 3300 of FIG. 33, a second plurality of stopper bumps 112 is formed on the top surface 104t of the MEMS structure 104. In some embodiments, the second plurality of stopper bumps 112 is formed by the stopper bump fabrication process illustrated and/or described in FIG. 31, such that the stopper bumps 112 are accurately formed to the height h1 which is, for example, within a range of about 15 µm to 50 µm or some other suitable value(s).

Figure 34:
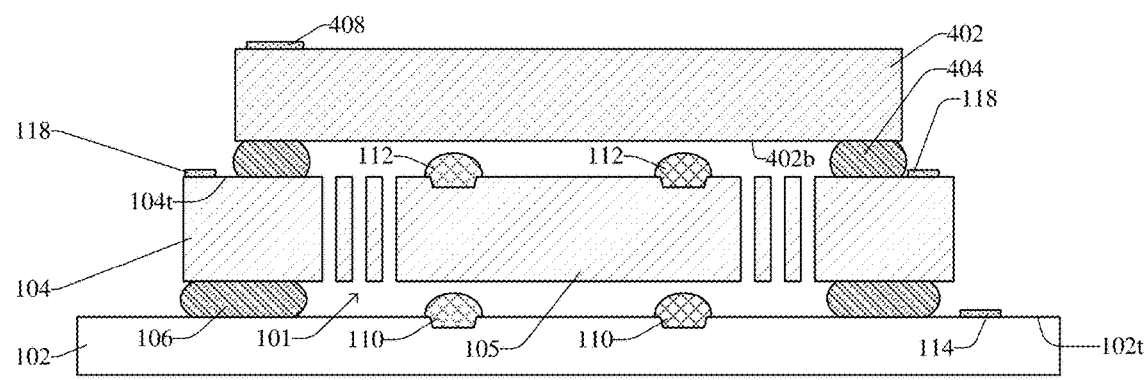

As shown in cross-sectional view 3400 of FIG. 34, an upper semiconductor die 402 is provided and attached to the MEMS structure 104. An upper metal pad 408 is disposed on the upper semiconductor die 402. In various embodiments, attaching the upper semiconductor die 402 to the MEMS structure 104 includes: forming a plurality of upper adhesive structures 404 on the top surface 104t of the MEMS structure 104; placing the upper semiconductor die 402 on the upper adhesive structures 404; and performing a curing process to harden the upper adhesive structures 404. The upper adhesive structures 404 may, for example, be formed by squeezing, pumping, dispensing, or otherwise providing a liquid on the top surface 104t of the MEMS structure 104. In various embodiments, the curing process hardens the liquid of the upper adhesive structures 404 to a solid.

Figure 35:
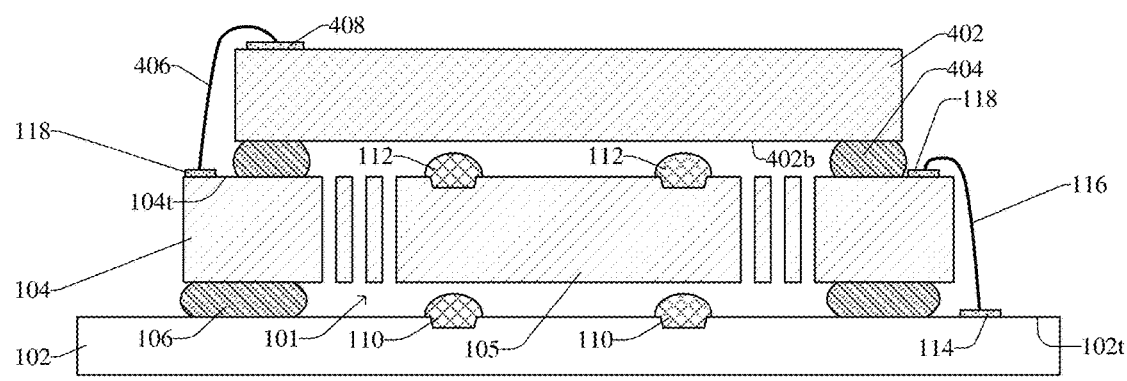

As shown in cross-sectional view 3500 of FIG. 35, a metal wire 116 and an upper metal wire 406 are formed. The metal wire 116 electrically couples the first metal pad 114 to the second plurality of metal pads 118, and the upper metal wire 406 electrically couples the second plurality of metal pads 118 to the upper metal pad 408. In various embodiments, the metal wire 116 and the upper metal wire 406 may each be formed by a wire bonding process or some other suitable process(es).

Figure 36:
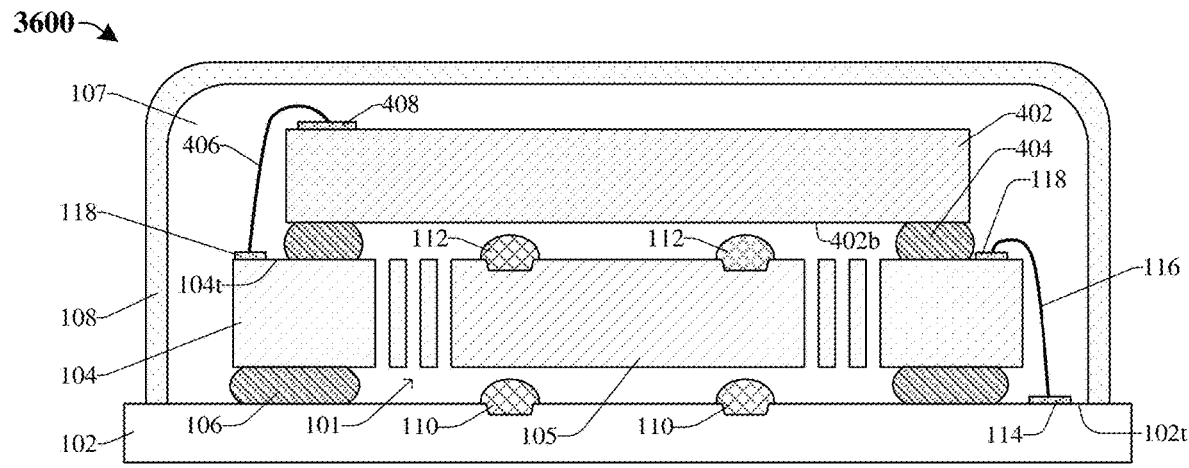

As shown in cross-sectional view 3600 of FIG. 36, a housing structure 108 is provided and attached to the substrate 102. In various embodiments, attaching the housing structure 108 to the substrate 102 includes: depositing (e.g., by squeezing, pumping, dispensing, etc.) an adhesive material (not shown) on the top surface 102t of the substrate 102 and/or on a bottom surface of the housing structure 108; disposing the housing structure 108 on the substrate 102 such that the adhesive material is between the housing structure 108 and the substrate 102; and performing a curing process to harden the adhesive material.

FIGS. 37-41 illustrate cross-sectional views 3700-4100 of some embodiments of a method for forming an IC comprising stopper bumps disposed between stacked ICs. The IC may, for example, correspond to the IC of FIG. 5. Although the cross-sectional views 3700-4100 shown in FIGS. 37-41 are described with reference to a method, it will be appreciated that the structures shown in FIGS. 37-41 are not limited to the method but rather may stand alone separate of the method. Furthermore, although FIGS. 37-41 are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 37:
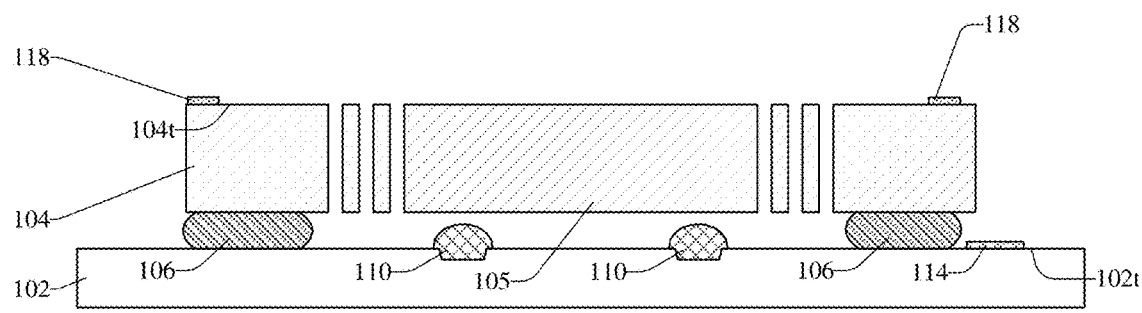
FIGS. 37-41 illustrate cross-sectional views of some embodiments of a method for forming an IC comprising stopper bumps disposed between stacked ICs.

As shown in cross-sectional view 3700 of FIG. 37, a MEMS structure 104 is provided and attached to a substrate 102. A first plurality of stopper bumps 110 is formed on a top surface 102t of the substrate 102. The structure of FIG. 37 may, for example, be formed as illustrated and/or described in FIGS. 30-32 (where the etching process utilized to form the upper stopper openings (3202 of FIG. 32) may be omitted).

Figure 38:
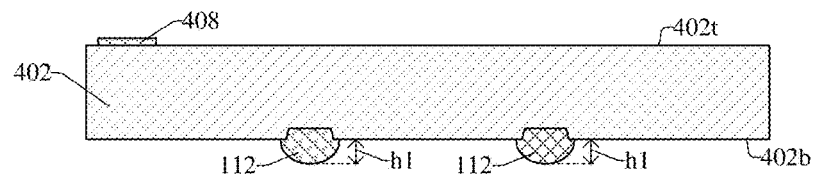

As shown in cross-sectional view 3800 of FIG. 38, an upper semiconductor die 402 is provided. The upper semiconductor die 402 includes an upper metal pad 408 disposed on a top surface 402t of the upper semiconductor die 402. Further, a second plurality of stopper bumps 112 is formed on a bottom surface 402b of the upper semiconductor die 402. In some embodiments, the second plurality of stopper bumps 112 is formed by the stopper bump fabrication process illustrated and/or described in FIG. 31, such that the stopper bumps 112 are accurately formed to the height h1 which is, for example, within a range of about 15 µm to 50 µm or some other suitable value(s).

Figure 39:
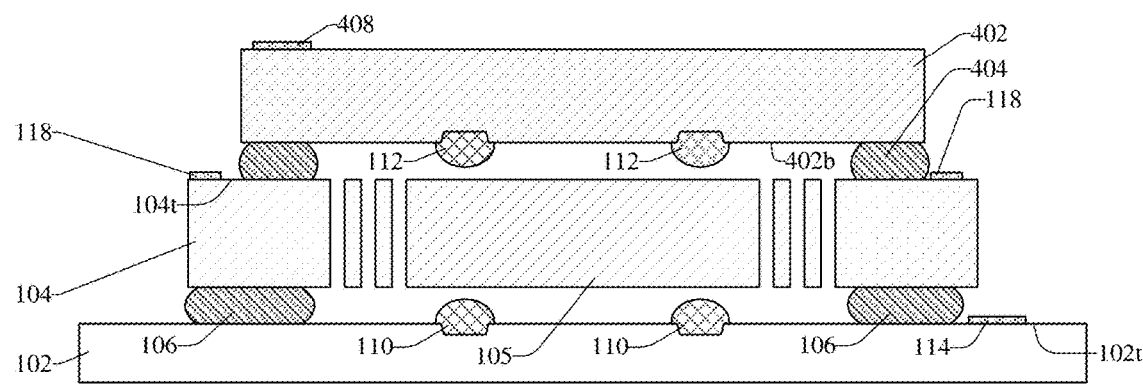

As shown in cross-sectional view 3900 of FIG. 39, the upper semiconductor die 402 of FIG. 38 is attached to the MEMS structure 104. In various embodiments, attaching the upper semiconductor die 402 to the MEMS structure 104 includes: forming a plurality of upper adhesive structures 404 on the top surface 104t of the MEMS structure 104; placing the upper semiconductor die 402 on the upper adhesive structures 404; and performing a curing process to harden the upper adhesive structures 404. The upper adhesive structures 404 may, for example, be formed by squeezing, pumping, dispensing, or otherwise providing a liquid on the top surface 104t of the MEMS structure 104. In various embodiments, the curing process hardens the liquid of the upper adhesive structures 404 to a solid.

Figure 40:
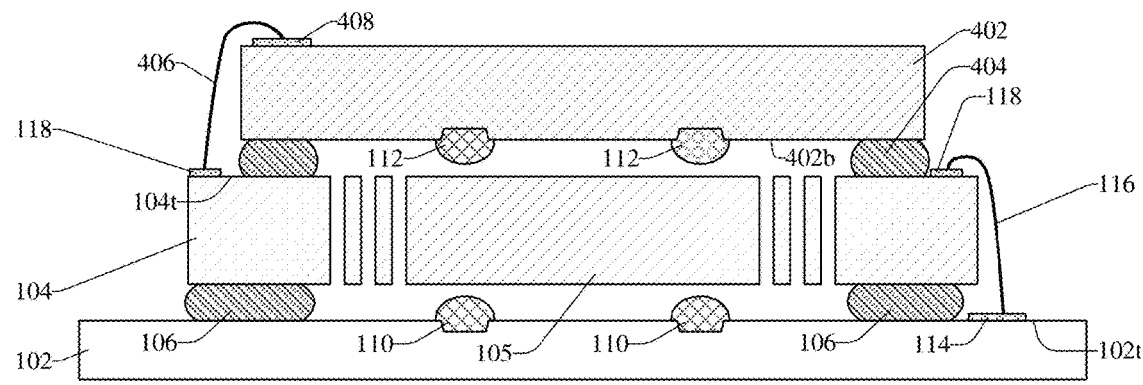

As shown in cross-sectional view 4000 of FIG. 40, a metal wire 116 and an upper metal wire 406 are formed. The metal wire 116 electrically couples the first metal pad 114 to the second plurality of metal pads 118, and the upper metal wire 406 electrically couples the second plurality of metal pads 118 to the upper metal pad 408. In various embodiments, the metal wire 116 and the upper metal wire 406 may each be formed by a wire bonding process or some other suitable process(es).

Figure 41:
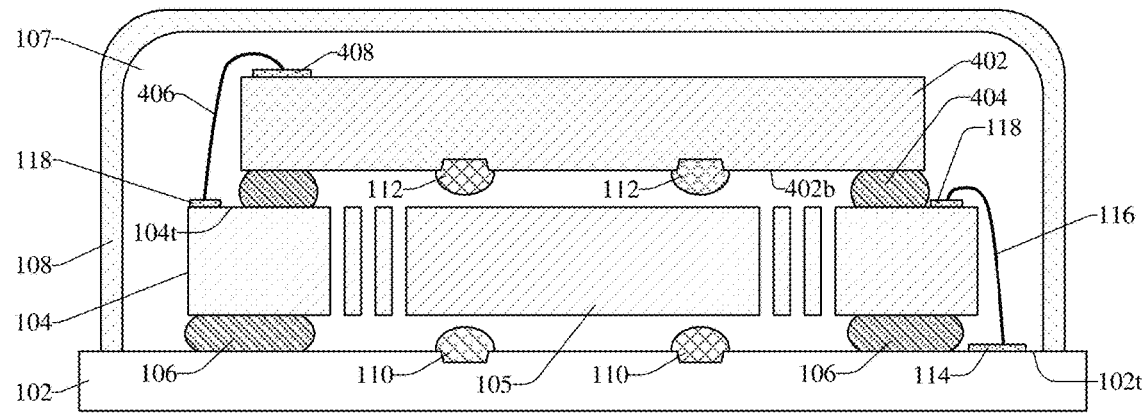

As shown in cross-sectional view 4100 of FIG. 41, a housing structure 108 is provided and attached to the substrate 102. In various embodiments, attaching the housing structure 108 to the substrate 102 includes: depositing (e.g., by squeezing, pumping, dispensing, etc.) an adhesive material (not shown) on the top surface 102t of the substrate 102 and/or on a bottom surface of the housing structure 108; disposing the housing structure 108 on the substrate 102 such that the adhesive material is between the housing structure 108 and the substrate 102; and performing a curing process to harden the adhesive material.

Figure 42:
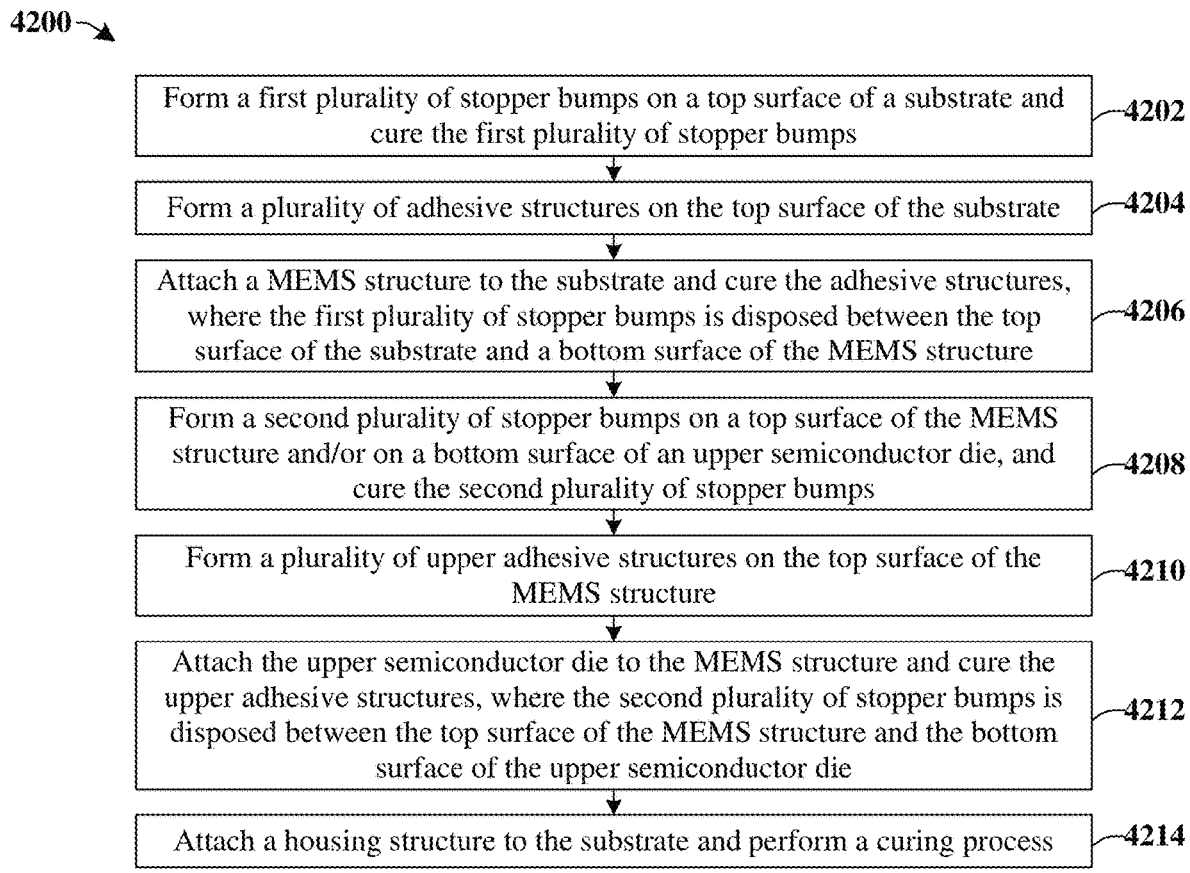
FIG. 42 illustrates a flowchart of some embodiments of a method for forming an IC comprising stopper bumps disposed between stacked ICs.

FIG. 42 illustrates a flowchart 4200 of some embodiments of a method for forming an IC comprising stopper bumps disposed between stacked ICs. Although the flowchart 4200 is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 4202, a first plurality of stopper bumps is formed on a top surface of a substrate and the first plurality of stopper bumps is cured. FIGS. 30 and 31 illustrate cross-sectional views 3000 and 3100 corresponding to various embodiments of act 4202.

At act 4204, a plurality of adhesive structures is formed on the top surface of the substrate. FIG. 32 illustrates cross-sectional view 3200 corresponding to various embodiments of act 4204.

At act 4206, a MEMS structure is attached to the substrate and the adhesive structures are cured. The first plurality of stopper bumps is disposed between the top surface of the substrate and a bottom surface of the MEMS structure. FIG. 32 illustrates cross-sectional view 3200 corresponding to various embodiments of act 4206.

At act 4208, a second plurality of stopper bumps is formed on a top surface of the MEMS structure and/or on a bottom surface of an upper semiconductor die, and the second plurality of stopper bumps is cured. FIGS. 32 and 33 illustrate cross-sectional views 3200 and 3300 corresponding to various embodiments of act 4208. FIG. 38 illustrates cross-sectional view 3800 corresponding to some embodiments of act 4208.

At act 4210, a plurality of upper adhesive structures is formed on the top surface of the MEMS structure. FIG. 34 illustrates cross-sectional view 3400 corresponding to various embodiments of act 4210. FIG. 39 illustrates cross-sectional view 3900 corresponding to some embodiments of act 4210.

At act 4212, the upper semiconductor die is attached to the MEMS structure and the upper adhesive structures are cured. The second plurality of stopper bumps is disposed between the top surface of the MEMS structure and the bottom surface of the upper semiconductor die. FIG. 34 illustrates cross-sectional view 3400 corresponding to various embodiments of act 4212. FIG. 39 illustrates cross-sectional view 3900 corresponding to some embodiments of act 4212.

At act 4214, a housing structure is attached to the substrate and a curing process is performed. FIG. 36 illustrates cross-sectional view 3600 corresponding to various embodiments of act 4214. FIG. 41 illustrates cross-sectional view 4100 corresponding to some embodiments of act 4214.

FIGS. 43-53 illustrate cross-sectional views 4300-5300 of some embodiments of a method for forming an IC comprising multiple stopper bump structures. The IC may, for example, correspond to the IC of FIG. 6. Although the cross-sectional views 4300-5300 shown in FIGS. 43-53 are described with reference to a method, it will be appreciated that the structures shown in FIGS. 43-53 are not limited to the method but rather may stand alone separate of the method. Furthermore, although FIGS. 43-53 are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 43:
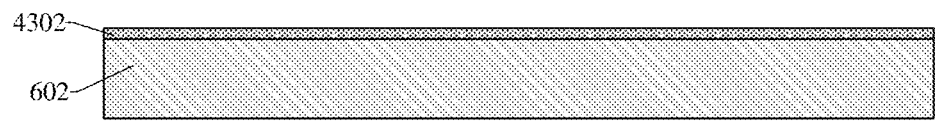
FIGS. 43-53 illustrate cross-sectional views of some embodiments of a method for forming an IC comprising multiple stopper bump structures.

As shown in cross-sectional view 4300 of FIG. 43, a capping structure 602 is provided and a dielectric layer 4302 is deposited on the capping structure 602. The dielectric layer 4302 may be deposited on a top surface of the capping structure 602 by, for example, CVD, PVD. ALD, or some other suitable fabrication or deposition process(es). The dielectric layer 4302 may, for example, be or comprise an oxide, silicon dioxide, other suitable dielectric material(s), or any combination of the foregoing.

Figure 44:
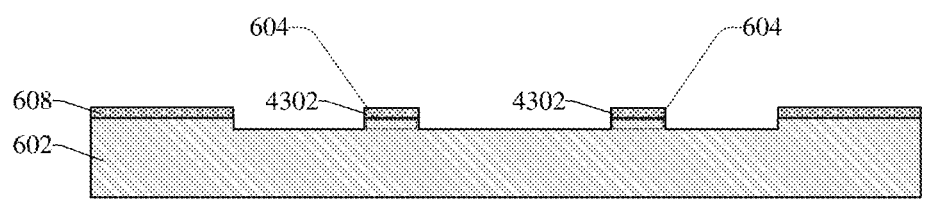

As shown in cross-sectional view 4400 of FIG. 44, a patterning process is performed on the capping structure 602 and the dielectric layer 4302, thereby forming a plurality of stopper structures 604 in the capping structure 602 and a bonding structure 608 that surrounds the stopper structures 604. In various embodiments, the patterning process includes: forming a masking layer (not shown) over the capping structure 602; etching the capping structure 602 and the dielectric layer 4302 according to the masking layer; and performing a removal process to remove the masking layer.

Figure 45:
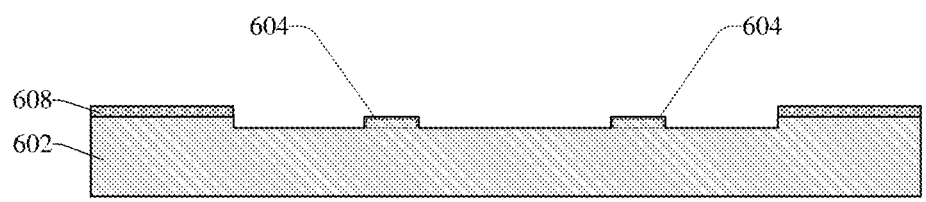

As shown in cross-sectional view 4500 of FIG. 45, a patterning process is performed to remove the dielectric layer (4302 of FIG. 44) from over the plurality of stopper structures 604.

Figure 46:
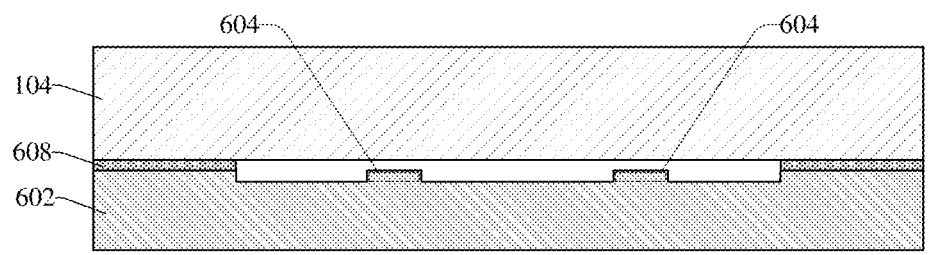

As shown in cross-sectional view 4600 of FIG. 46, a MEMS structure 104 is provided and bonded to the bonding structure 608. In some embodiments, the MEMS structure 104 is bonded to the bonding structure 608 by a eutectic bonding process, a fusion bonding process, some other suitable bonding process(es), or any combination of the foregoing.

Figure 47:
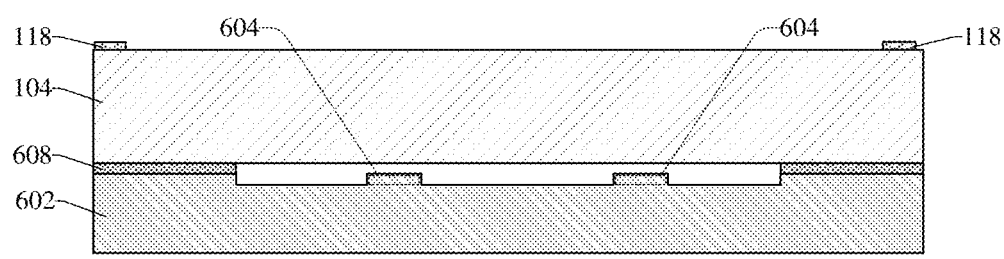

As shown in cross-sectional view 4700 of FIG. 47, a second plurality of metal pads 118 is formed on the MEMS structure 104. In some embodiments, a process for forming the second plurality of metal pads 118 includes depositing (e.g., by CVD, PVD, ALD, electroplating, electroless plating, etc.) a metal material over the MEMS structure 104 and patterning the metal material.

Figure 48:
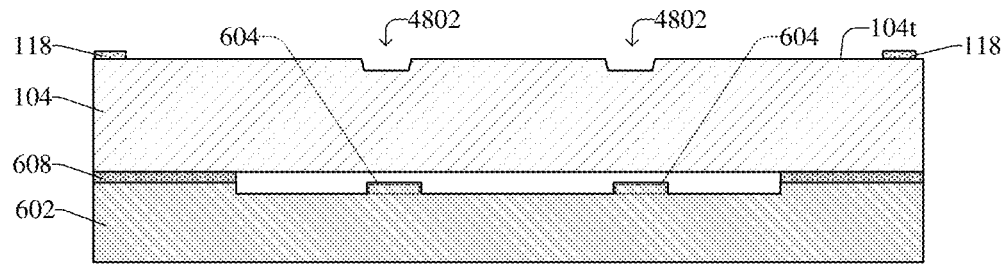

As shown in cross-sectional view 4800 of FIG. 48, an etching process is performed to form a plurality of stopper openings 4802 in a top surface 104t of the MEMS structure 104. In some embodiments, the etching process includes: forming a masking layer (not shown) over the top surface 104t of the MEMS structure 104; etching the MEMS structure 104 according to the masking layer; and performing a removal process to remove the masking layer.

Figure 49:
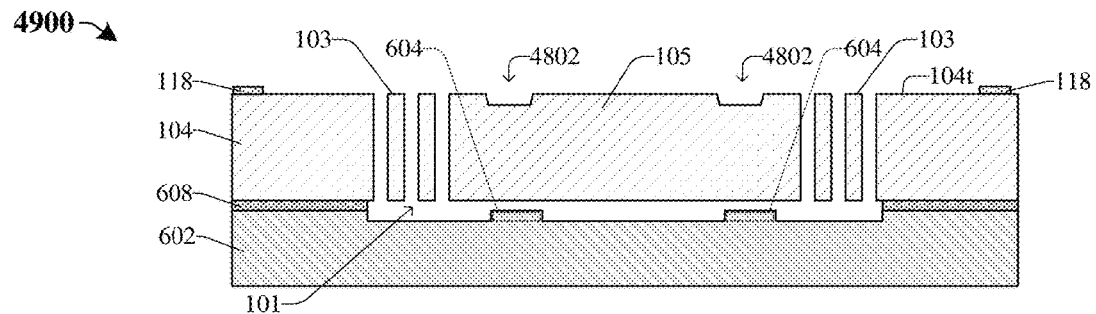

As shown in cross-sectional view 4900 of FIG. 49, an etching process is performed on the MEMS structure 104 to form a MEMS device 101 in the MEMS structure 104. In various embodiments, the MEMS device 101 comprises a movable element 105 and springs 103, where the springs 103 suspend the movable element 105 over the stopper structures 604. The etching process may, for example, include a wet etch, a dry etch, or some other suitable etch process(es).

Figure 50:
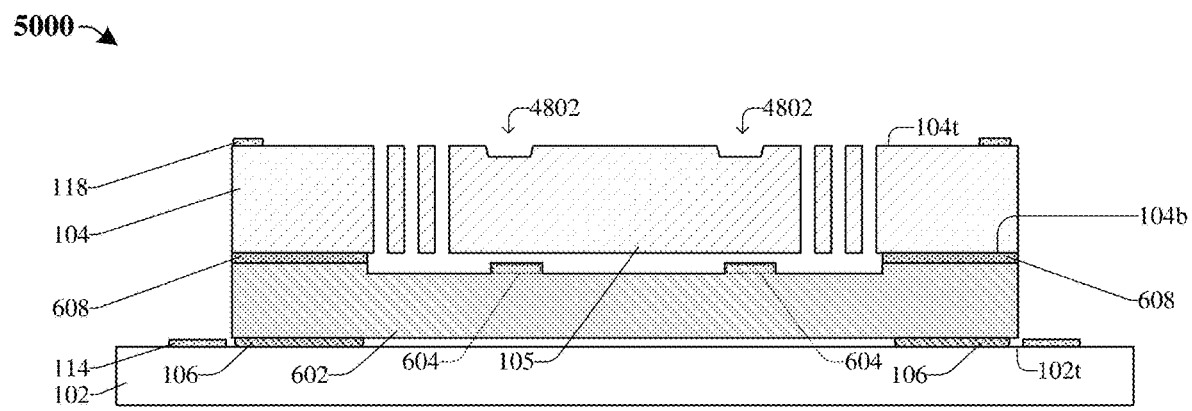

As shown in cross-sectional view 5000 of FIG. 50, a substrate 102 is provided and attached to the MEMS structure 104. The substrate 102 includes a first plurality of metal pads 114 disposed on a top surface 102t of the substrate 102. In some embodiments, attaching the MEMS structure 104 to the substrate 102 includes: forming a plurality of adhesive structures 106 on the top surface 102t of the substrate; placing the MEMS structure 104 on the adhesive structures 106; and performing a curing process to harden the adhesive structures 106. The adhesive structures 106 may, for example, be formed by squeezing, pumping, dispensing, or otherwise providing a liquid on the top surface 102t of the substrate 102. In some embodiments, the curing process hardens the liquid of the adhesive structures 106 to a solid.

Figure 51:
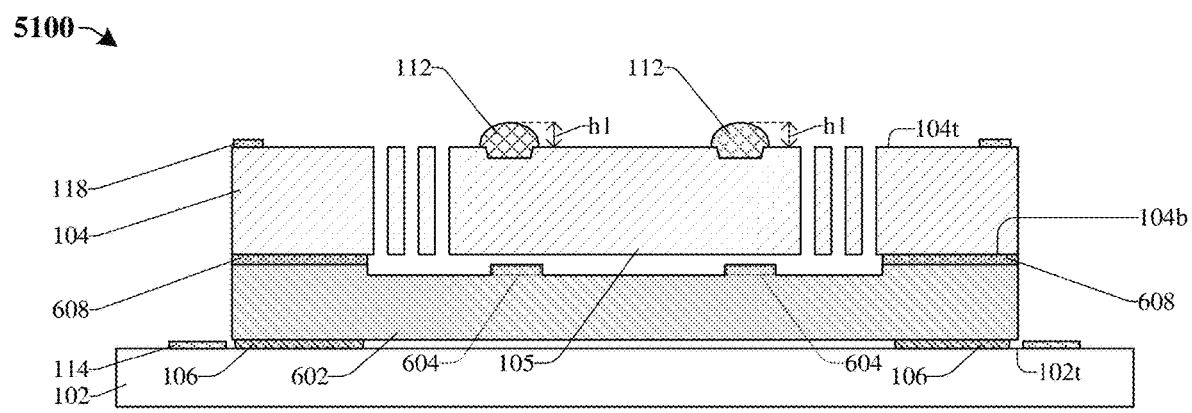

As shown in cross-sectional view 5100 of FIG. 51, a second plurality of stopper bumps 112 is formed along the top surface 104t of the MEMS structure 104 and within the stopper openings (4802 of FIG. 50). The second plurality of stopper bumps 112 may be formed by a stopper bump fabrication process. The stopper bump fabrication process includes performing a deposition process (e.g., a screen printing process, a syringe dispensing process, an ink-jet printing process, etc.) with high thickness control (e.g., forming the stopper bumps 112 within a range of +/−10% of a target thickness) such that the stopper bumps 112 are each accurately formed to a height h1 that is relatively large (e.g., greater than about 15 μm). For example, a size of the stopper openings (4802 of FIG. 50), viscosity of the material deposited, drop pressure, and/or nozzle size may be adjusted to ensure the stopper bumps 112 are formed to the height h1 with high thickness control. In further embodiments, the stopper bump fabrication process may include fabrication of openings (e.g., the stopper openings 4802 of FIG. 50) before performing the aforementioned deposition process. The stopper bumps 112 may, for example, be or comprise polymer, epoxy, silicon, other suitable material(s), or any combination of the foregoing. In some embodiments, the height h1 is, for example, within a range of about 15 μm to 50 μm or some other suitable value(s). In various embodiments, after depositing the stopper bumps 112 by the deposition process (e.g., a screen printing process, a syringe dispensing process, an ink-jet printing process, etc.), the stopper bump fabrication process further includes performing a curing process to harden the stopper bumps 112. For example, the stopper bumps 112 may be deposited as a liquid and the curing process hardens the liquid of the stopper bumps 112 to a solid material. Accurately forming the stopper bumps 112 to the relatively large height h1 with good thickness control facilitates the stopper bumps 112 promoting good gap control.

Figure 52:
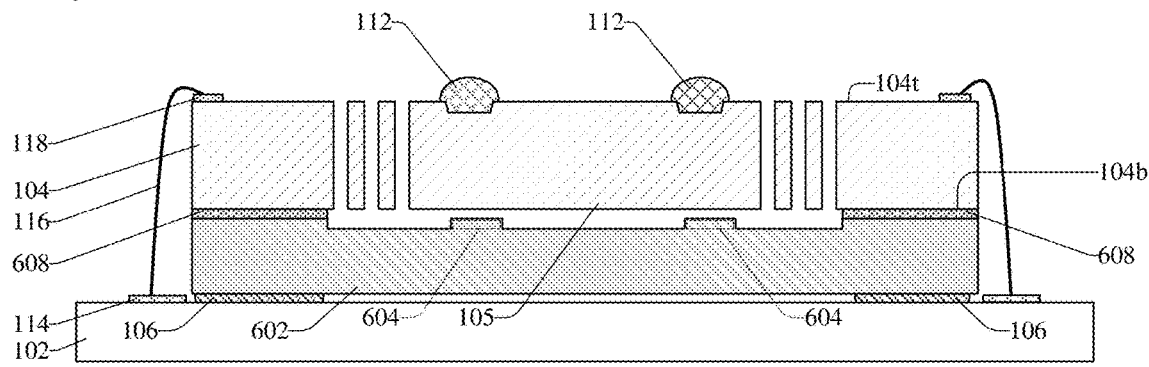

As shown in cross-sectional view 5200 of FIG. 52, metal wires 116 are formed and electrically couple the first plurality of metal pads 114 to the second plurality of metal pads 118. In various embodiments, the metal wires 116 may be formed by a wire bonding process or some other suitable process(es).

Figure 53:
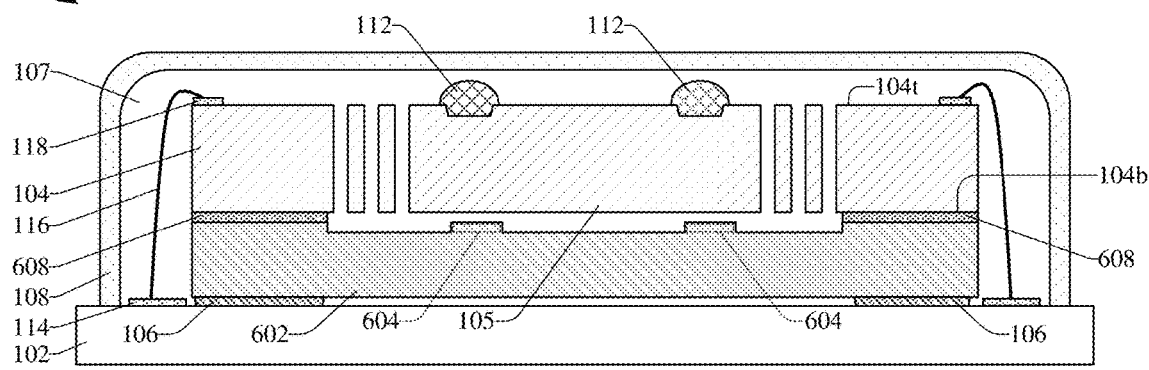

As shown in cross-sectional view 5300 of FIG. 53, a housing structure 108 is provided and attached to the substrate 102. In various embodiments, attaching the housing structure 108 to the substrate 102 includes: depositing (e.g., by squeezing, pumping, dispensing, etc.) an adhesive material (not shown) on the top surface 102t of the substrate 102 and/or on a bottom surface of the housing structure 108; disposing the housing structure 108 on the substrate 102 such that the adhesive material is between the housing structure 108 and the substrate 102; and performing a curing process to harden the adhesive material.

FIGS. 54-57 illustrate cross-sectional views 5400-5700 of some embodiments of a method for forming an IC comprising multiple stopper bump structures. The IC may, for example, correspond to the IC of FIG. 7. Although the cross-sectional views 5400-5700 shown in FIGS. 54-57 are described with reference to a method, it will be appreciated that the structures shown in FIGS. 54-57 are not limited to the method but rather may stand alone separate of the method. Furthermore, although FIGS. 54-57 are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 54:
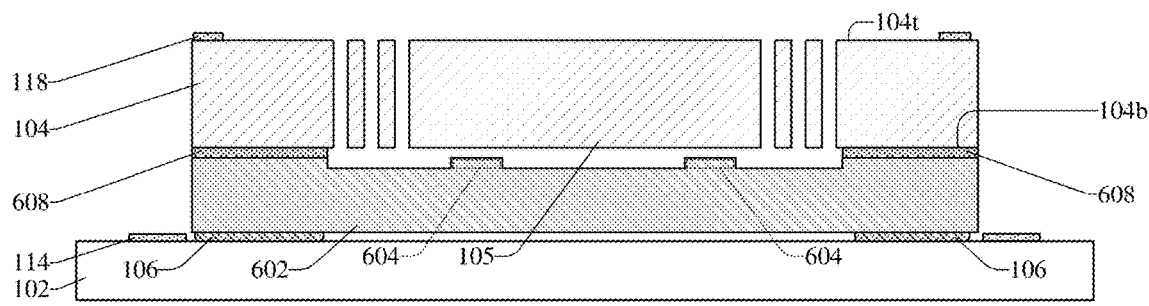
FIGS. 54-57 illustrate cross-sectional views of some embodiments of a method for forming an IC comprising multiple stopper bump structures.

As shown in cross-sectional view 5400 of FIG. 54, a MEMS structure 104 and capping structure 602 are provided and attached to a substrate 102. A plurality of stopper structures 604 is formed within and/or on an upper surface of the capping structure 602. The structure of FIG. 54 may, for example, be formed as illustrated and/or described in FIGS. 43-50 (where the etching process utilized to form the stopper openings (4802 of FIG. 48) may be omitted).

Figure 55:
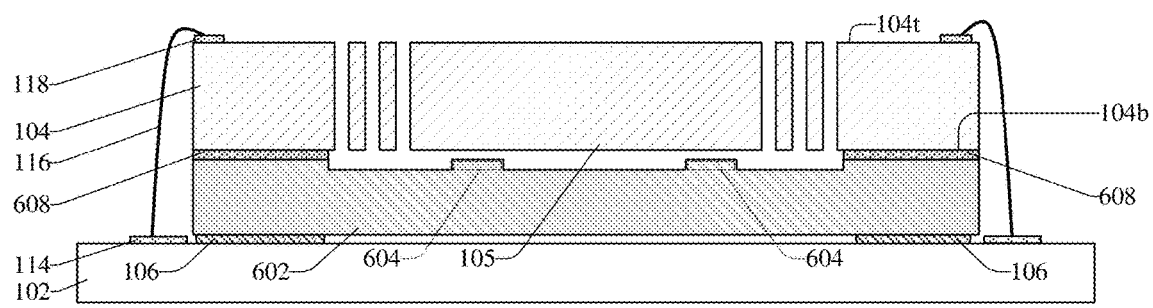

As shown in cross-sectional view 5500 of FIG. 55, metal wires 116 are formed and electrically couple the first plurality of metal pads 114 to the second plurality of metal pads 118. In various embodiments, the metal wires 116 may be formed by a wire bonding process or some other suitable process(es).

Figure 56:
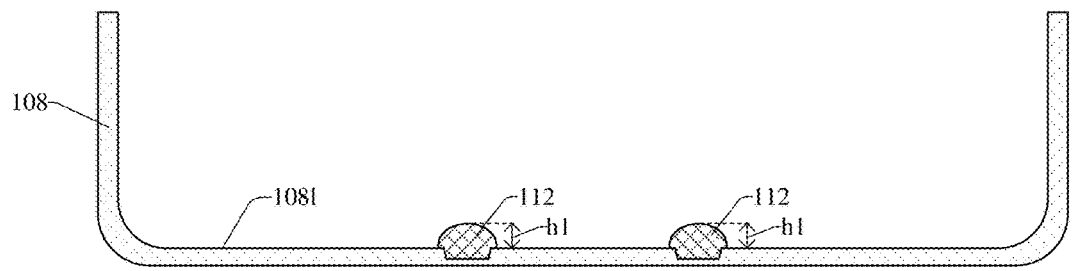

As shown in cross-sectional view 5600 of FIG. 56, a housing structure 108 is provided and a second plurality of stopper bumps 112 is formed within and/or on a lower surface 108l of the housing structure 108. In various embodiments, the second plurality of stopper bumps 112 is formed by the stopper bump fabrication process illustrated and/or described in FIG. 51, such that the stopper bumps are accurately formed to the height h1 which is, for example, within a range of about 15 μm to 50 μm or some other suitable value(s).

Figure 57:
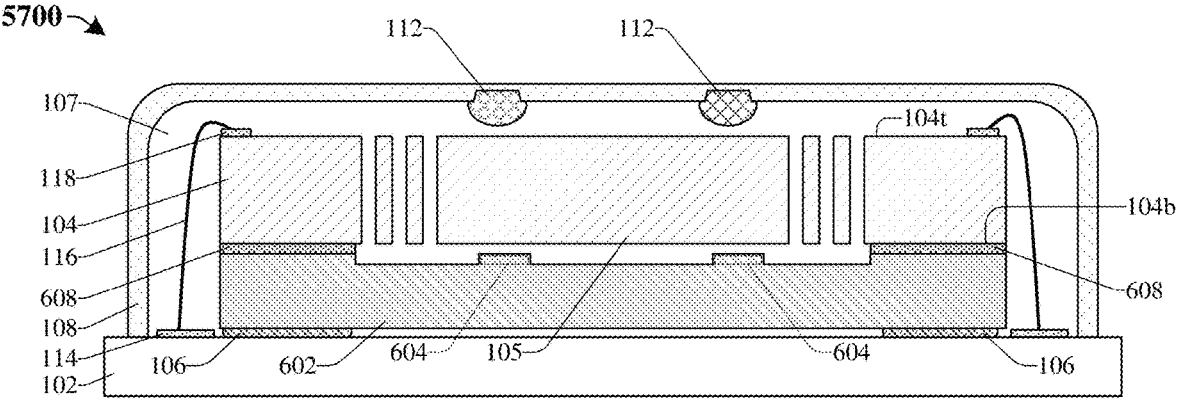

As shown in cross-sectional view 5700 of FIG. 57, the housing structure 108 of FIG. 56 is attached to the substrate 102, such that the second plurality of stopper bumps 112 is disposed between the housing structure 108 and the MEMS structure 104. A cavity 107 is defined between the lower surface 108l of the housing structure 108 and the top surface 102t of the substrate 102. In various embodiments, attaching the housing structure 108 to the substrate 102 includes: depositing (e.g., by squeezing, pumping, dispensing, etc.) an adhesive material (not shown) on the top surface 102t of the substrate 102 and/or on a bottom surface of the housing structure 108; disposing the housing structure 108 on the substrate 102 such that the adhesive material is between the housing structure 108 and the substrate 102; and performing a curing process to harden the adhesive material.

Figure 58:
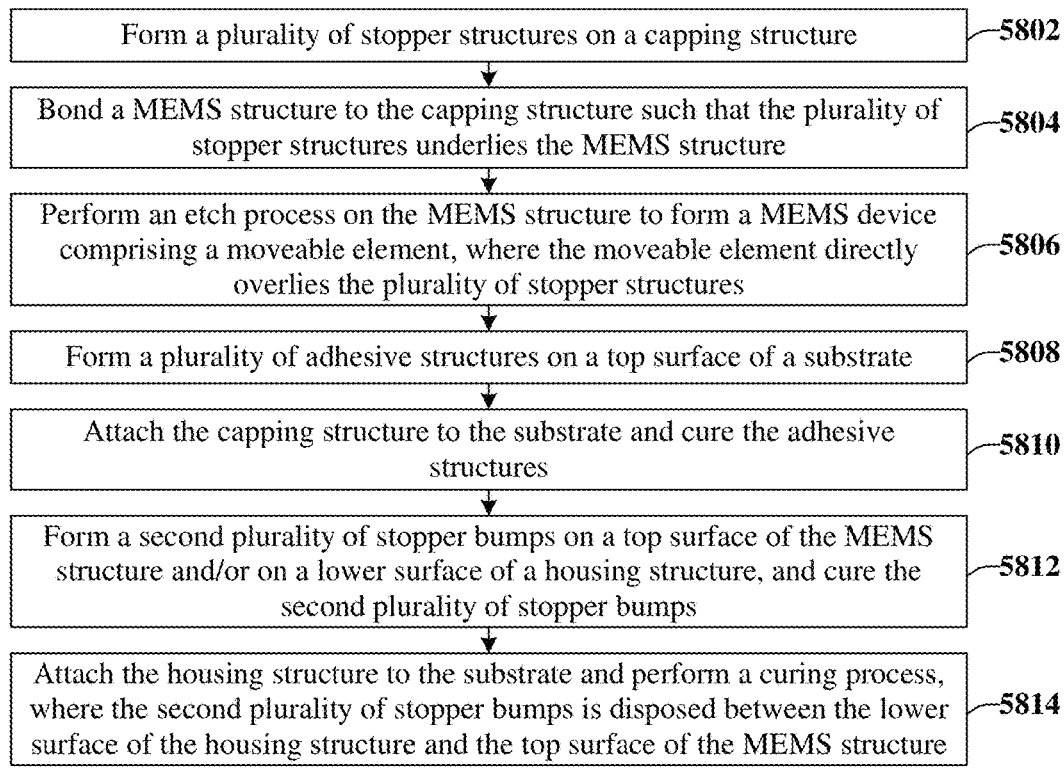
FIG. 58 illustrates a flowchart of some embodiments of a method for forming an IC comprising multiple stopper bump structures.

FIG. 58 illustrates a flowchart 5800 of some embodiments of a method for forming an IC comprising multiple stopper bump structures. Although the flowchart 5800 is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 5802, a plurality of stopper structures is formed on a capping structure. FIG. 44 illustrates cross-sectional view 4400 corresponding to various embodiments of act 5802.

At act 5804, a MEMS structure is bonded to the capping structure such that the plurality of stopper structures underlies the MEMS structure. FIG. 46 illustrates cross-sectional view 4600 corresponding to various embodiments of act 5804.

At act 5806, an etch process is performed on the MEMS structure to form a MEMS device comprising a movable element, where the movable element directly overlies the plurality of stopper structures. FIG. 49 illustrates cross-sectional view 4900 corresponding to various embodiments of act 5806.

At act 5808, a plurality of adhesive structures is formed on a top surface of a substrate. FIG. 50 illustrates cross-sectional view 5000 corresponding to various embodiments of act 5808.

At act 5810, the capping structure is attached to the substrate and the adhesive structures are cured. FIG. 50 illustrates cross-sectional view 5000 corresponding to various embodiments of act 5810.

At act 5812, a second plurality of stopper bumps is formed on a top surface of the MEMS structure and/or on a lower surface of a housing structure, and the second plurality of stopper bumps is cured. FIGS. 48 and 51 illustrate cross-sectional views 4800 and 5100 corresponding to various embodiments of act 5812. FIG. 56 illustrates cross-sectional view 5600 corresponding to some embodiments of act 5812.

At act 5814, the housing structure is attached to the substrate and a curing process is performed, where the second plurality of stopper bumps is disposed between the lower surface of the housing structure and the top surface of the MEMS structure. FIG. 53 illustrates cross-sectional view 5300 corresponding to various embodiments of act 5814. FIG. 57 illustrates cross-sectional view 5700 corresponding to some embodiments of act 5814.

FIGS. 59-64 illustrate cross-sectional views 5900-6400 of some embodiments of a method for forming an IC comprising multiple stopper bump structures. The IC may, for example, correspond to the IC of FIG. 8. Although the cross-sectional views 5900-6400 shown in FIGS. 59-64 are described with reference to a method, it will be appreciated that the structures shown in FIGS. 59-64 are not limited to the method but rather may stand alone separate of the method. Furthermore, although FIGS. 59-64 are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 59:
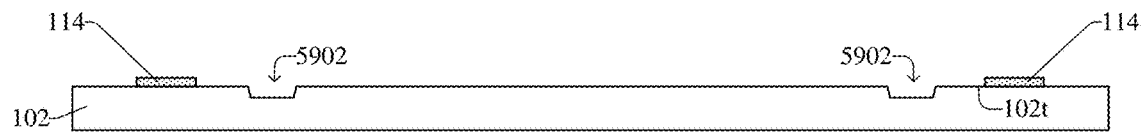
FIGS. 59-64 illustrate cross-sectional views of some embodiments of a method for forming an IC comprising multiple stopper bump structures.

As shown in cross-sectional view 5900 of FIG. 59, a substrate 102 is provided. A first plurality of metal pads 114 is formed on a top surface 102*t* of the substrate 102 and a plurality of stopper openings 5902 is formed in the substrate 102. In some embodiments, a process for forming the metal pads 114 includes: depositing (e.g., by CVD, PVD, atomic layer deposition (ALD), electroplating, electroless plating, etc.) a metal material over the substrate 102 and patterning the metal material. In further embodiments, a process for forming the plurality of stopper openings 5902 includes: forming a masking layer (not shown) over the top surface 102*t* of the substrate 102; etching the substrate 102 according to the masking layer; and performing a removal process to remove the masking layer.

Figure 60:
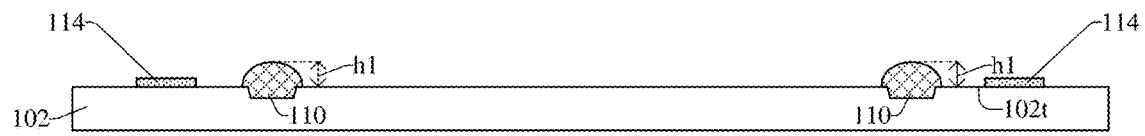

As shown in cross-sectional view 6000 of FIG. 60, a first plurality of stopper bumps 110 is formed along the top surface 102*t* of the substrate 102 and within the stopper openings (5902 of FIG. 59). The first plurality of stopper bumps 110 may be formed by a stopper bump fabrication process. The stopper bump fabrication process includes performing a deposition process (e.g., a screen printing process, a syringe dispensing process, an ink-jet printing process, etc.) with high thickness control (e.g., forming the stopper bumps 110 within a range of +/−10% of a target thickness) such that the stopper bumps 110 are each accurately formed to a height h1 that is relatively large (e.g., greater than about 15 μm). For example, a size of the stopper openings (5902 of FIG. 59), viscosity of the material deposited, drop pressure, and/or nozzle size may be adjusted to ensure the stopper bumps 110 are formed to the height h1 with high thickness control. In further embodiments, the stopper bump fabrication process may include fabrication of openings (e.g., the stopper openings 5902 of FIG. 59) before performing the aforementioned deposition process. The stopper bumps 110 may, for example, be or comprise polymer, epoxy, silicon, other suitable material(s), or any combination of the foregoing. In some embodiments, the height h1 is, for example, within a range of about 15 μm to 50 μm or some other suitable value(s). In various embodiments, after depositing the stopper bumps 110 by the deposition process (e.g., a screen printing process, a syringe dispensing process, an ink-jet printing process, etc.), the stopper bump fabrication process further includes performing a curing process to harden the stopper bumps 110. For example, the stopper bumps 110 may be deposited as a liquid and the curing process hardens the liquid of the stopper bumps 110 to a solid material. Accurately forming the stopper bumps 110 to the relatively large height h1 with good thickness control facilitates the stopper bumps 110 promoting good gap control.

Figure 61:
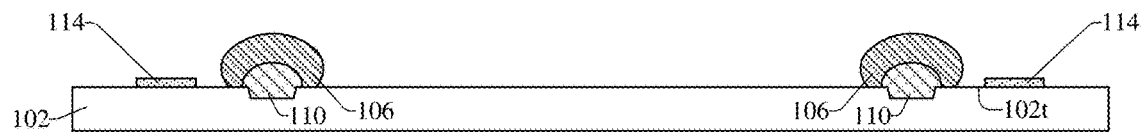

As shown in cross-sectional view 6100 of FIG. 61, a plurality of adhesive structures 106 is formed on the top surface 102*t* of the substrate 102 and around/on each of the stopper bumps 110. The adhesive structures 106 may, for example, be formed by squeezing, pumping, dispensing, or otherwise providing a liquid on the substrate 102 and the first plurality of stopper bumps 110.

Figure 62:
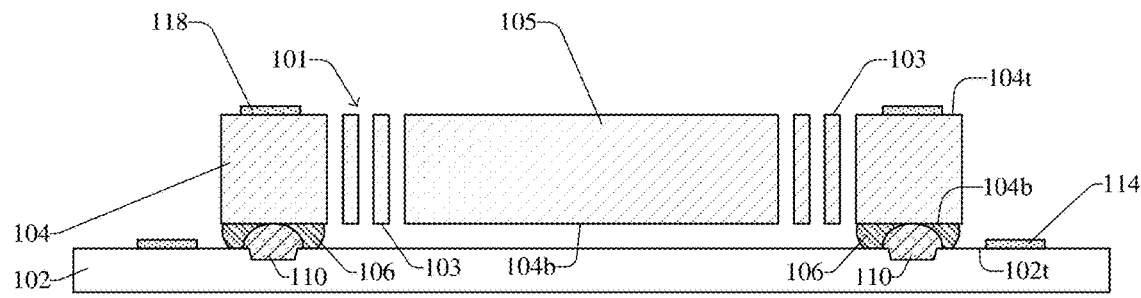

As shown in cross-sectional view 6200 of FIG. 62, a MEMS structure 104 is provided and attached to the substrate 102. In various embodiments, the MEMS structure 104 includes a second plurality of metal pads 118 disposed on a top surface 104*t* of the MEMS structure 104 and a MEMS device 101 that may, for example, comprise a movable element 105 and springs 103. A bottom surface 104b of the MEMS structure 104 is attached to the plurality of adhesive structures 106. In various embodiments, after the MEMS structure 104 is attached to the adhesive structures 106, a curing process is performed such that the liquid of the adhesive structures 106 hardens to a solid material.

Figure 63:
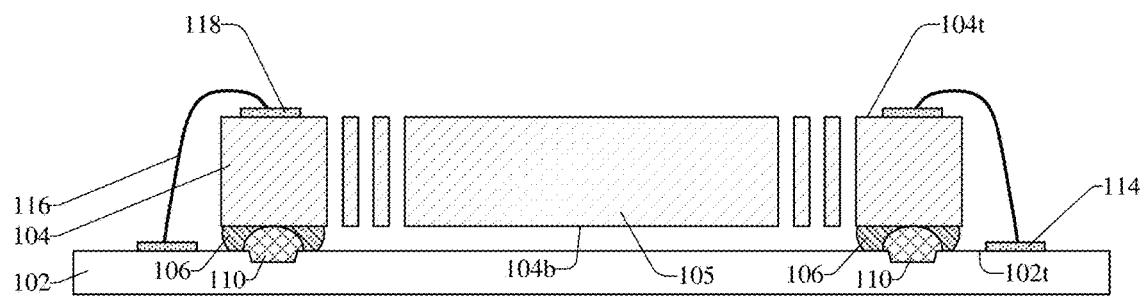

As shown in cross-sectional view 6300 of FIG. 63, metal wires 116 are formed and electrically couple the first plurality of metal pads 114 to the second plurality of metal pads 118. In various embodiments, the metal wires 116 may be formed by a wire bonding process or some other suitable process(es).

Figure 64:
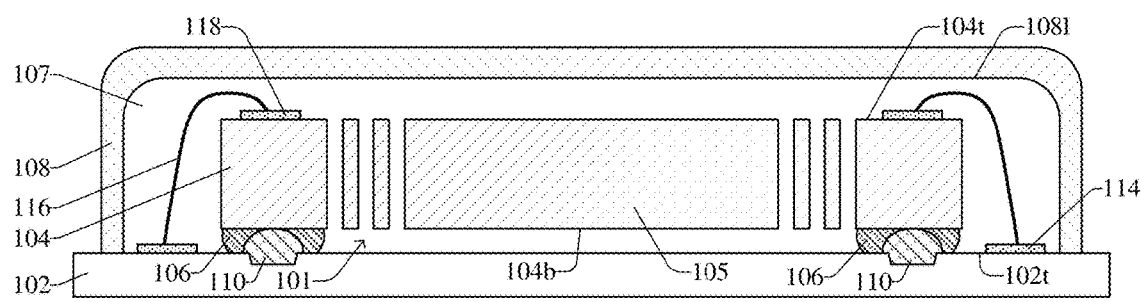

As shown in cross-sectional view 6400 of FIG. 64, a housing structure 108 is provided and attached to the substrate 102. In various embodiments, attaching the housing structure 108 to the substrate 102 includes: depositing (e.g., by squeezing, pumping, dispensing, etc.) an adhesive material (not shown) on the top surface 102t of the substrate 102 and/or on a bottom surface of the housing structure 108; disposing the housing structure 108 on the substrate 102 such that the adhesive material is between the housing structure 108 and the substrate 102; and performing a curing process to harden the adhesive material.

FIGS. 65-69 illustrate cross-sectional views 6500-6900 of some embodiments of a method for forming an IC comprising multiple stopper bump structures. The IC may, for example, correspond to the IC of FIG. 9. Although the cross-sectional views 6500-6900 shown in FIGS. 65-69 are described with reference to a method, it will be appreciated that the structures shown in FIGS. 65-69 are not limited to the method but rather may stand alone separate of the method. Furthermore, although FIGS. 65-69 are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 65:
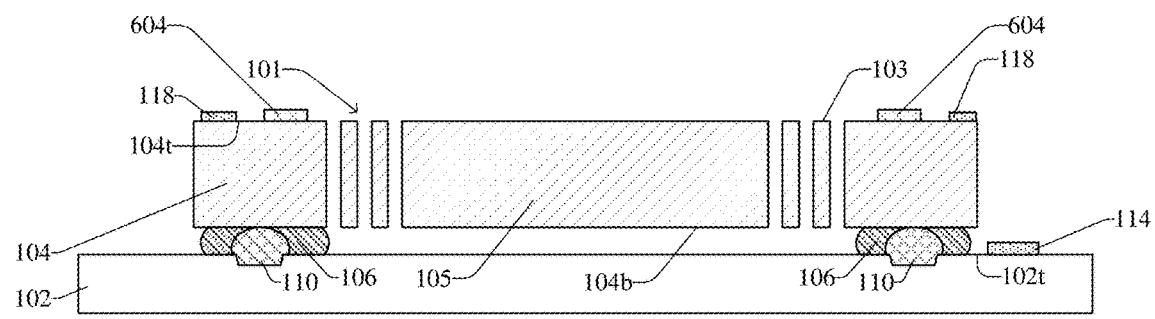
FIGS. 65-69 illustrate cross-sectional views of some embodiments of a method for forming an IC comprising multiple stopper bump structures.

As shown in cross-sectional view 6500 of FIG. 65, a MEMS structure 104 is provided and attached to a substrate 102. A first plurality of stopper bumps 110 is formed within and/or on a top surface 102t of the substrate 102. The structure of FIG. 65 may, for example, be formed as illustrated and/or described in FIGS. 59-62. Further, a plurality of stopper structures 604 is formed on a top surface 104t of the MEMS structure 104. In some embodiments, a process for forming the plurality of stopper structures 604 includes depositing (e.g., by CVD, PVD, ALD, etc.) a stopper material (e.g., silicon) on the MEMS structure 104 and etching the stopper material.

Figure 66:
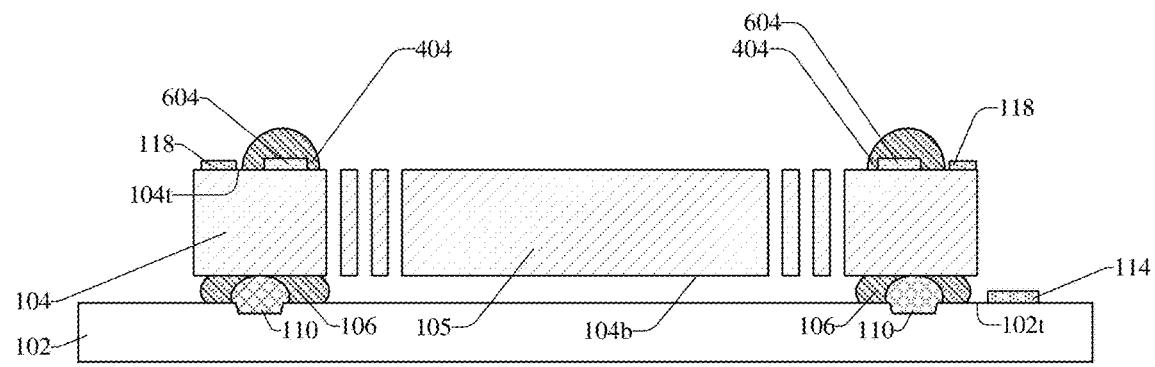

As shown in cross-sectional view 6600 of FIG. 66, a plurality of upper adhesive structures 404 is formed on the MEMS structure 104 and the plurality of stopper structures 604. The upper adhesive structures 404 may, for example, be formed by squeezing, pumping, dispensing, or otherwise providing a liquid on the MEMS structure 104 and the plurality of stopper structures 604.

Figure 67:
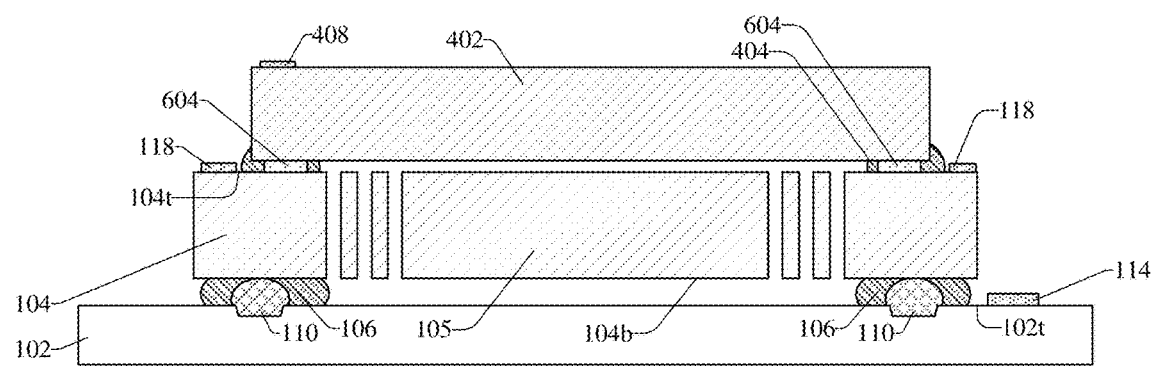

As shown in cross-sectional view 6700 of FIG. 67, an upper semiconductor die 402 is provided and attached to the MEMS structure 104. The upper semiconductor die 402 includes an upper metal pad 408 disposed on a top surface 402t of the upper semiconductor die 402. In various embodiments, the upper semiconductor die 402 is placed on the upper adhesive structures 404, and a curing process is performed to harden the upper adhesive structures 404 and attach the upper semiconductor die 402 to the stopper structures 604. In some embodiments, the curing process hardens the liquid of the upper adhesive structures 404 to a solid.

Figure 68:
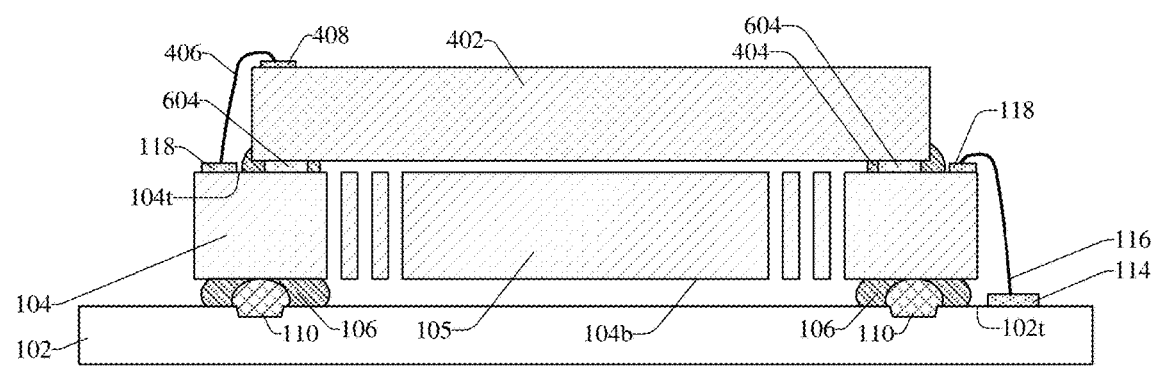

As shown in cross-sectional view 6800 of FIG. 68, a metal wire 116 and an upper metal wire 406 are formed. The metal wire 116 electrically couples the first metal pad 114 to the second plurality of metal pads 118, and the upper metal wire 406 electrically couples the second plurality of metal pads 118 to the upper metal pad 408. In various embodiments, the metal wire 116 and the upper metal wire 406 may each be formed by a wire bonding process or some other suitable process(es).

Figure 69:
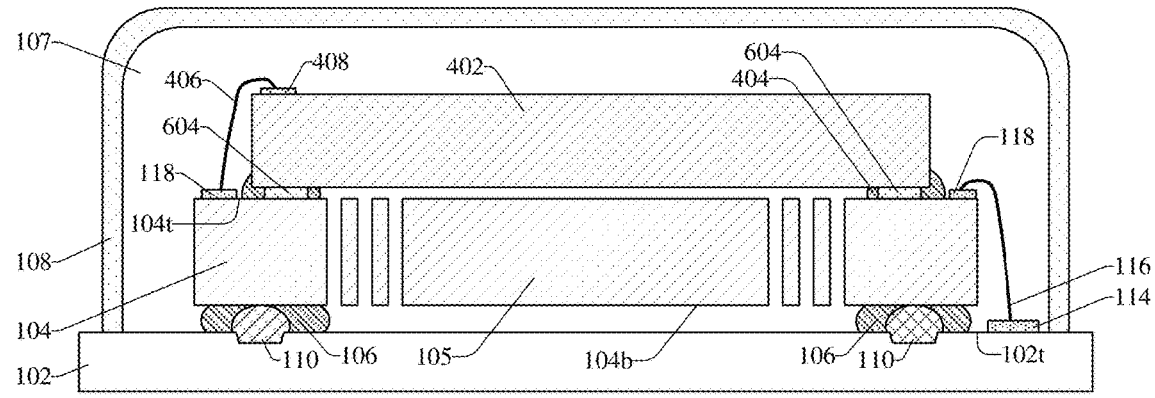

As shown in cross-sectional view 6900 of FIG. 69, a housing structure 108 is provided and attached to the substrate 102. In various embodiments, attaching the housing structure 108 to the substrate 102 includes: depositing (e.g., by squeezing, pumping, dispensing, etc.) an adhesive material (not shown) on the top surface 102t of the substrate 102 and/or on a bottom surface of the housing structure 108; disposing the housing structure 108 on the substrate 102 such that the adhesive material is between the housing structure 108 and the substrate 102; and performing a curing process to harden the adhesive material.

Figure 70:
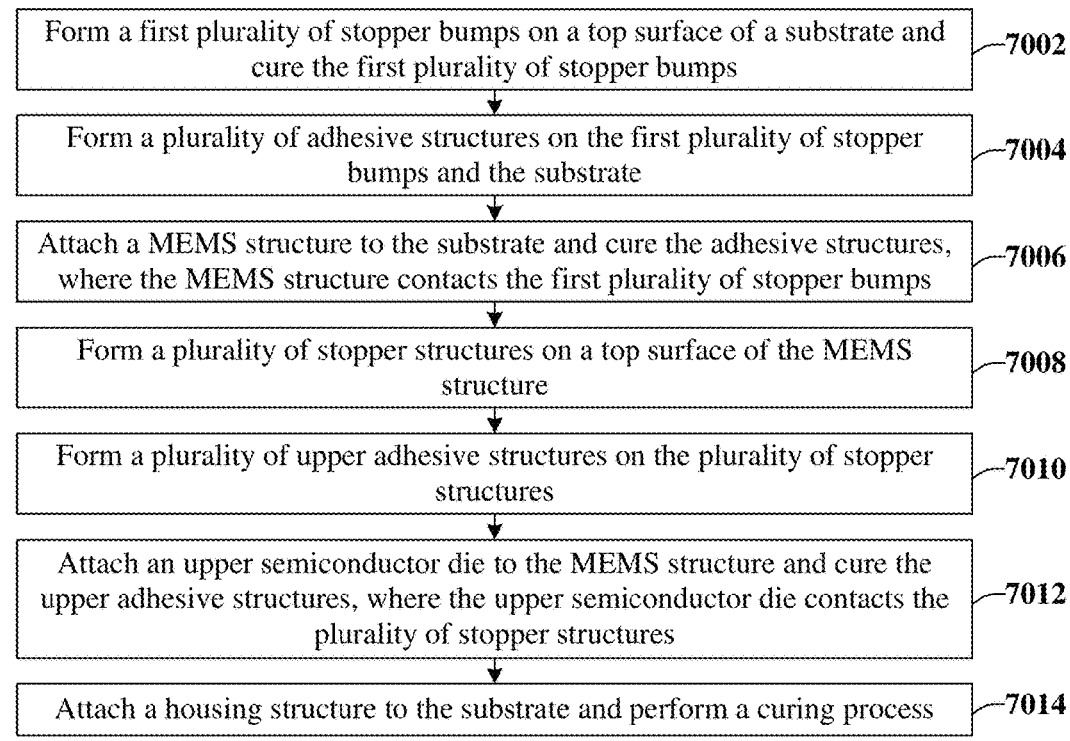
FIG. 70 illustrates a flowchart of some embodiments of a method for forming an IC comprising multiple stopper bump structures.

FIG. 70 illustrates a flowchart 7000 of some embodiments of a method for forming an IC comprising multiple stopper bump structures. Although the flowchart 7000 is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 7002, a first plurality of stopper bumps is formed on a top surface of a substrate and the first plurality of stopper bumps is cured. FIGS. 59 and 60 illustrate cross-sectional views 5900 and 6000 corresponding to various embodiments of act 7002.

At act 7004, a plurality of adhesive structures is formed on the first plurality of stopper bumps and the substrate. FIG. 61 illustrates cross-sectional view 6100 corresponding to various embodiments of act 7004.

At act 7006, a MEMS structure is attached to the substrate and the adhesive structures are cured, where the MEMS structure contacts the first plurality of stopper bumps. FIG. 62 illustrates cross-sectional view 6200 corresponding to various embodiments of act 7006.

At act 7008, a plurality of stopper structures is formed on a top surface of the MEMS structure. FIG. 65 illustrates cross-sectional view 6500 corresponding to various embodiments of act 7008.

At act 7010, a plurality of upper adhesive structures is formed on the plurality of stopper structures. FIG. 66 illustrates cross-sectional view 6600 corresponding to various embodiments of act 7010.

At act 7012, an upper semiconductor die is attached to the MEMS structure and the upper adhesive structures are cured, where the upper semiconductor die contacts the plurality of stopper structures. FIG. 67 illustrates cross-sectional view 6700 corresponding to various embodiments of act 7012.

At act 7014, a housing structure is attached to the substrate and a curing process is performed. FIG. 64 illustrates cross-sectional view 6400 corresponding to various embodiments of act 7014. FIG. 69 illustrates cross-sectional view 6900 corresponding to some embodiments of act 7014.

Accordingly, in some embodiments, the present disclosure relates to an IC including a MEMS structure overlying a substrate, a housing structure over the MEMS structure, and multiple stopper bumps below and/or above the MEMS structure.

In some embodiments, the present application provides an integrated chip (IC), including: a substrate; a plurality of adhesive structures disposed on the substrate; a microelectromechanical systems (MEMS) structure disposed on the adhesive structures, wherein the MEMS structure comprises a movable element disposed within a cavity; and a first plurality of stopper bumps disposed between the movable element and the substrate.

In some embodiments, the present application provides an integrated chip (IC), including: a substrate; a housing structure overlying the substrate, wherein a cavity is defined between a top surface of the substrate and a lower surface of the housing structure; a microelectromechanical systems (MEMS) structure overlying the substrate, wherein the MEMS structure comprises a movable element suspended in the cavity; and a plurality of upper stopper bumps disposed between a top surface of the MEMS structure and the lower surface of the housing structure, wherein the upper stopper bumps directly overlie the movable element.

In some embodiments, the present application provides a method for forming an integrated chip (IC), the method including: forming a first plurality of stopper bumps on a substrate; forming a plurality of adhesive structures on the substrate; attaching a microelectromechanical systems (MEMS) structure to the adhesive structures; forming a second plurality of stopper bumps over the MEMS structure; and attaching a housing structure to the substrate, wherein the second plurality of stopper bumps is disposed between the MEMS structure and a lower surface of the housing structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An integrated chip (IC), comprising:
   a substrate comprising a plurality of sidewalls defining a plurality of recesses extending into a top surface of the substrate;
   a plurality of adhesive structures disposed on the substrate;
   a microelectromechanical systems (MEMS) structure disposed on the adhesive structures, wherein the MEMS structure comprises a movable element disposed within a cavity; and
   a first plurality of stopper bumps disposed in the plurality of recesses and between the movable element and the substrate,
   wherein the first plurality of stopper bumps contact the top surface of the substrate,
   wherein the first plurality of stopper bumps directly contact a respective pair of sidewalls in the plurality of sidewalls at one or more interfaces,
   wherein the one or more interfaces are regions where a first material of the substrate directly contacts a second material of the first plurality of stopper bumps.

2. The IC of claim 1, wherein the first plurality of stopper bumps directly underlies the movable element.

3. The IC of claim 1, wherein the first plurality of stopper bumps directly contacts the substrate and the MEMS structure, and wherein the adhesive structures respectively surround and contact a stopper bump in the first plurality of stopper bumps.

4. The IC of claim 1, further comprising:
   a housing structure overlying the MEMS structure, wherein the housing structure is disposed on the substrate and laterally surrounds the MEMS structure; and
   a second plurality of stopper bumps disposed between a lower surface of the housing structure and a top surface of the MEMS structure.

5. The IC of claim 4, wherein the second plurality of stopper bumps comprises the second material.

6. The IC of claim 4, wherein the second plurality of stopper bumps directly contacts the top surface of the MEMS structure.

7. The IC of claim 4, wherein the first plurality of stopper bumps and the second plurality of stopper bumps respectively comprise a polymer.

8. The IC of claim 4, further comprising:
   an upper semiconductor die disposed on the MEMS structure, wherein the second plurality of stopper bumps is disposed between the upper semiconductor die and the top surface of the MEMS structure.

9. An integrated chip (IC), comprising:
   a substrate;
   a housing structure overlying the substrate, wherein a cavity is defined between a top surface of the substrate and a lower surface of the housing structure;
   a microelectromechanical systems (MEMS) structure overlying the substrate, wherein the MEMS structure comprises a movable element suspended in the cavity; and
   a plurality of upper stopper bumps disposed between a top surface of the movable element and the lower surface of the housing structure, wherein the upper stopper bumps each comprise a first segment having a first height in the movable element and a second segment having a second height above the top surface of the movable element, wherein the first height is less than the second height, wherein a first vertical distance between a top surface of the plurality of upper stopper bumps and the lower surface of the housing structure is less than the second height.

10. The IC of claim 9, further comprising:
    a plurality of metal pads disposed on the top surface of the substrate; and
    a plurality of lower stopper bumps directly contacting the top surface of the substrate, wherein the lower stopper bumps directly underlie the movable element, wherein the lower stopper bumps comprise a same material as the upper stopper bumps.

11. An integrated chip (IC), comprising:
    a housing structure overlying a substrate;
    a microelectromechanical systems (MEMS) structure disposed between the substrate and a lower surface of the housing structure;

a first plurality of stopper structures disposed between the substrate and a lower surface of the MEMS structure; and a second plurality of stopper structures disposed between the lower surface of the housing structure and an upper surface of the MEMS structure, wherein first segments of the second plurality of stopper structures are embedded in the housing structure and are above the lower surface of the housing structure, wherein second segments of the second plurality of stopper structures underlie the first segments and contact the lower surface of the housing structure, wherein widths of the first segments are less than widths of the second segments.

12. The IC of claim 11, wherein the first plurality of stopper structures comprises stopper structures arranged in an array comprising at least two rows and at least two columns.

13. The IC of claim 11, further comprising:
a first contact pad arranged on the substrate;
a second contact pad arranged over the MEMS structure; and
a conductive wire extending from the first contact pad to the second contact pad.

14. The IC of claim 11, wherein a height of the first plurality of stopper structures is less than a height of the second plurality of stopper structures.

15. The IC of claim 9, wherein the movable element comprises an upper surface below the top surface of the movable element and a sidewall extending from the top surface of the movable element to the upper surface, wherein the first segment of an individual upper stopper bump in the plurality of upper stopper bumps continuously extends along and contacts the sidewall and the upper surface of the movable element.

16. The IC of claim 8, wherein the second plurality of stopper bumps is arranged on the movable element, wherein a vertical distance between a top surface of the second plurality of stopper bumps and a bottommost surface of the upper semiconductor die is less than a height of the second plurality of stopper bumps.

17. The IC of claim 16, wherein a width of each stopper bump in the first plurality of stopper bumps is equal to or greater than a width of a corresponding recess in the plurality of recesses.

18. The IC of claim 16, wherein a lateral surface of an individual stopper bump in the first plurality of stopper bumps contacting the top surface of the substrate is ring shaped.

19. The IC of claim 16, wherein the first material is different from the second material.

20. The IC of claim 16, wherein a vertical distance between a top surface of the first plurality of stopper bumps and a bottom surface of the movable element is less than a height of the first plurality of stopper bumps.

* * * * *